(12) United States Patent
Aoki

(10) Patent No.: US 6,402,322 B1
(45) Date of Patent: Jun. 11, 2002

(54) POLARIZATION SEPARATION ELEMENT, POLARIZATION CONVERSION ELEMENT, AND PROJECTOR

(75) Inventor: Kazuo Aoki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 09/598,482

(22) Filed: Jun. 22, 2000

(30) Foreign Application Priority Data

Jul. 12, 1999 (JP) ............................................ 11-197687

(51) Int. Cl.⁷ ........................ G03B 21/14; G02F 1/1335; G02B 27/28
(52) U.S. Cl. ............................... 353/20; 349/9; 359/487
(58) Field of Search ................................. 359/487, 352, 359/483, 488, 489, 495, 497, 498, 499, 583; 353/20; 349/8, 9

(56) References Cited

U.S. PATENT DOCUMENTS 5,912,762 A  6/1999  Li et al. ...................... 359/352

FOREIGN PATENT DOCUMENTS

| EP | 0 359 658 A2 | 3/1990 | ............ G02B/27/28 |
| EP | 0 821 258 A2 | 1/1998 | ............ G02B/1/10 |
| JP | A-6-82623 | 3/1994 | ............ G02B/5/30 |
| JP | A-10-90520 | 4/1998 | ............ G02B/5/30 |
| JP | A-10-177151 | 6/1998 | ............ G02B/27/28 |

Primary Examiner—Russell Adams
Assistant Examiner—Melissa J. Koval
(74) Attorney, Agent, or Firm—Oliff & Berridge PLC

(57) ABSTRACT

To provide a polarization conversion element which makes it possible to achieve high production efficiency. A polarization conversion element in accordance with the present invention includes a plurality of transmissive members arranged along a predetermined direction, and a plurality of polarization separation films and a plurality of reflection films alternately disposed between the plurality of transmissive members. In each polarization separation film, a transmittance ratio for an ultraviolet light beam of a particular wavelength range which is incident on a surface of each polarization separation film at an angle of incidence of approximately 0 degrees is approximately 40% or more. Each reflection film may be formed so that its transmittance ratio for an ultraviolet light beam of a particular wavelength range which is incident on a surface of each reflection film at an angle of incidence of approximately zero degrees is approximately 40% or more.

31 Claims, 21 Drawing Sheets

STRUCTURE OF POLARIZATION SEPARATION FILM

DESIGN WAVELENGTH $\lambda$: 600nm

LAYER L: $MgF_2$ (n = 1.38)

LAYER H: MgO (n = 1.73)

COVERING LAYER: $SiO_2$

| LAYER | | $D(=n \cdot d \cdot 4/\lambda)$ |
|---|---|---|
| L | 1 | 1.070 |
| H | 2 | 0.119 |
| L | 3 | 0.244 |
| H | 4 | 1.926 |
| L | 5 | 0.034 |
| H | 6 | 1.047 |
| L | 7 | 1.049 |
| H | 8 | 0.906 |
| L | 9 | 1.125 |
| H | 10 | 0.953 |
| L | 11 | 1.168 |
| H | 12 | 0.925 |
| L | 13 | 1.014 |
| H | 14 | 0.726 |
| L | 15 | 0.973 |
| H | 16 | 0.965 |
| L | 17 | 1.199 |
| H | 18 | 0.971 |
| L | 19 | 1.168 |
| H | 20 | 1.001 |
| L | 21 | 1.323 |
| H | 22 | 1.217 |
| L | 23 | 1.440 |
| H | 24 | 1.091 |
| L | 25 | 1.257 |
| H | 26 | 1.029 |
| L | 27 | 1.328 |
| H | 28 | 1.201 |
| L | 29 | 1.398 |
| H | 30 | 1.133 |

| | | |
|---|---|---|
| L | 31 | 1.394 |
| H | 32 | 1.219 |
| L | 33 | 1.560 |
| H | 34 | 1.223 |
| L | 35 | 1.542 |
| H | 36 | 1.756 |
| L | 37 | 1.487 |
| H | 38 | 1.623 |
| L | 39 | 1.455 |
| H | 40 | 1.733 |
| L | 41 | 1.464 |
| H | 42 | 1.540 |
| L | 43 | 1.584 |
| H | 44 | 1.766 |
| L | 45 | 1.624 |
| H | 46 | 1.655 |
| L | 47 | 1.599 |
| H | 48 | 1.712 |
| L | 49 | 1.721 |
| COVERING LAYER | | 3.000 |

FIG. 6

STRUCTURE OF REFLECTIVE FILM

DESIGN WAVELENGTH $\lambda$: 600nm

LAYER L: $SiO_2$ (n = 1.44)

LAYER H: $TiO_2$ (n = 2.266)

| LAYER | | $D(=n \cdot d \cdot 4/\lambda)$ |
|---|---|---|
| L | 1 | 0.631 |
| H | 2 | 0.554 |
| L | 3 | 1.010 |
| H | 4 | 0.964 |
| L | 5 | 1.010 |
| H | 6 | 0.964 |
| L | 7 | 1.010 |
| H | 8 | 0.964 |
| L | 9 | 1.010 |
| H | 10 | 0.964 |
| L | 11 | 1.010 |
| H | 12 | 0.964 |
| L | 13 | 1.010 |
| H | 14 | 0.964 |
| L | 15 | 1.010 |
| H | 16 | 0.964 |
| L | 17 | 1.010 |
| H | 18 | 0.964 |
| L | 19 | 1.910 |
| H | 20 | 1.123 |
| L | 21 | 1.910 |
| H | 22 | 1.123 |
| L | 23 | 1.910 |
| H | 24 | 1.123 |
| L | 25 | 1.910 |
| H | 26 | 1.123 |
| L | 27 | 1.910 |
| H | 28 | 1.123 |
| L | 29 | 1.910 |
| H | 30 | 1.123 |
| L | 31 | 3.103 |

FIG. 8

STRUCTURE OF POLARIZATION SEPARATION FILM

DESIGN WAVELENGTH λ: 600nm

LAYER L: $MgF_2$ (n = 1.38)

LAYER H: MgO (n = 1.73)

COVERING LAYER: $SiO_2$

| LAYER | | D(=n·d·4/λ) |
|---|---|---|
| L | 1 | 1.874 |
| H | 2 | 1.812 |
| L | 3 | 1.897 |
| H | 4 | 0.583 |
| L | 5 | 1.937 |
| H | 6 | 0.479 |
| L | 7 | 1.414 |
| H | 8 | 0.906 |
| L | 9 | 1.125 |
| H | 10 | 0.953 |
| L | 11 | 1.168 |
| H | 12 | 0.925 |
| L | 13 | 1.014 |
| H | 14 | 0.726 |
| L | 15 | 0.973 |
| H | 16 | 0.965 |
| L | 17 | 1.199 |
| H | 18 | 0.971 |
| L | 19 | 1.168 |
| H | 20 | 1.001 |
| L | 21 | 1.323 |
| H | 22 | 1.217 |
| L | 23 | 1.440 |
| H | 24 | 1.091 |
| L | 25 | 1.257 |
| H | 26 | 1.029 |
| L | 27 | 1.328 |
| H | 28 | 1.201 |
| L | 29 | 1.398 |
| H | 30 | 1.133 |
| L | 31 | 1.394 |
| H | 32 | 1.219 |
| L | 33 | 1.560 |
| H | 34 | 1.223 |
| L | 35 | 1.542 |
| H | 36 | 1.756 |
| L | 37 | 1.487 |
| H | 38 | 1.623 |
| L | 39 | 1.455 |
| H | 40 | 1.733 |
| L | 41 | 1.464 |
| H | 42 | 1.540 |
| L | 43 | 1.584 |
| H | 44 | 1.766 |
| L | 45 | 1.624 |
| H | 46 | 1.655 |
| L | 47 | 1.599 |
| H | 48 | 1.712 |
| L | 49 | 1.721 |
| COVERING LAYER | | 3.000 |

FIG. 12(A)

STRUCTURE OF POLARIZATION REFLECTIVE FILM

DESIGN WAVELENGTH λ: 600nm

LAYER L: $SiO_2$ (n = 1.44)

LAYER H: $TiO_2$ (n = 2.266)

| LAYER | | D(=n·d·4/λ) |
|---|---|---|
| L | 1 | 1.234 |
| H | 2 | 0.636 |
| L | 3 | 1.815 |
| H | 4 | 0.840 |
| L | 5 | 1.825 |
| H | 6 | 0.827 |
| L | 7 | 1.570 |
| H | 8 | 0.964 |
| L | 9 | 1.010 |
| H | 10 | 0.964 |
| L | 11 | 1.010 |
| H | 12 | 0.964 |
| L | 13 | 1.010 |
| H | 14 | 0.964 |
| L | 15 | 1.010 |
| H | 16 | 0.964 |
| L | 17 | 1.010 |
| H | 18 | 0.964 |
| L | 19 | 1.910 |
| H | 20 | 1.123 |
| L | 21 | 1.910 |
| H | 22 | 1.123 |
| L | 23 | 1.910 |
| H | 24 | 1.123 |
| L | 25 | 1.910 |
| H | 26 | 1.123 |
| L | 27 | 1.910 |
| H | 28 | 1.123 |
| L | 29 | 1.910 |
| H | 30 | 1.123 |
| L | 31 | 3.103 |

FIG. 12(B)

STRUCTURE OF POLARIZATION REFLECTIVE FILM 332A

DESIGN WAVELENGTH $\lambda$: 600nm

LAYER L: $SiO_2$ (n = 1.44)

LAYER H: $Ta_2O_5$ (n = 2.18)

| LAYER | | D |
|---|---|---|
| L | 1 | 0.631 |
| H | 2 | 0.554 |
| L | 3 | 1.010 |
| H | 4 | 0.964 |
| L | 5 | 1.010 |
| H | 6 | 0.964 |
| L | 7 | 1.010 |
| H | 8 | 0.964 |
| L | 9 | 1.010 |
| H | 10 | 0.964 |
| L | 11 | 1.010 |
| H | 12 | 0.964 |
| L | 13 | 1.010 |
| H | 14 | 0.964 |
| L | 15 | 1.010 |
| H | 16 | 0.964 |
| L | 17 | 1.010 |
| H | 18 | 0.964 |
| L | 19 | 1.910 |
| H | 20 | 1.123 |
| L | 21 | 1.910 |
| H | 22 | 1.123 |
| L | 23 | 1.910 |
| H | 24 | 1.123 |
| L | 25 | 1.910 |
| H | 26 | 1.123 |
| L | 27 | 1.910 |
| H | 28 | 1.123 |
| L | 29 | 1.910 |
| H | 30 | 1.123 |
| L | 31 | 3.103 |

FIG. 17

POLARIZATION SEPARATION ELEMENT, POLARIZATION CONVERSION ELEMENT, AND PROJECTOR

BACKGROUND OF THE INVENTION

1. Field of Invention

The present invention relates to a polarization conversion element for converting an unpolarized light beam incident thereto into a predetermined polarized light beam, a method of producing the polarization conversion element, and a projector including the polarization conversion element.

2. Description of Related Art

A light-modulation element, which can be referred to as a light valve, is used in a projector in order to modulate a light beam in accordance with an image signal. A light valve of the type which uses only one type of linearly polarized light beam, such as a transmissive liquid crystal panel or a reflection liquid crystal panel, is often used. Accordingly, a projector, which uses one type of linearly polarized light beam, includes a polarization conversion element for converting an unpolarized light beam, which has exited a light source, into one type of linearly polarized light beam (such as an s-polarized light beam or a p-polarized light beam).

Examples of conventional polarization conversion elements are described in Japanese Unexamined Patent Application Publication No. 10-177151 and Japanese Unexamined Patent Application Publication No. 10-90520 disclosed by the Applicant.

A conventional polarization conversion element is produced, for example, by cutting out a polarization beam splitter array, making up the polarization conversion element from a composite plate formed by alternately bonding, with an adhesive, a transmissive plate having a polarization separation film and a reflection film formed thereon, and a transmissive plate which does not have anything formed thereon.

The step of bonding multiple transmissive members together takes a relatively long time to perform because it is ordinarily performed by repeatedly bonding the plates together with ultraviolet curing optical adhesive and curing the optical adhesive. In order to increase the efficiency with which the polarization conversion element is produced, there has been a desire to increase the efficiency with which the bonding step is performed.

SUMMARY OF THE INVENTION

The present invention overcomes the aforementioned conventional problem. An object of the invention is to provide a technology which makes it possible to produce a polarization conversion element with high efficiency.

To solve at least part of the aforementioned problem, a first producing method in accordance with the present invention is a method of producing a polarization conversion element that converts an unpolarized light beam incident thereto to a predetermined polarized light beam, the method comprising the steps of:

(a) providing a plurality of first transmissive plates;

(b) providing a plurality of second transmissive plates;

(c) forming a plurality of polarization separation films and a plurality of reflection films on surfaces of portions of the first transmissive plates or the second transmissive plates, so that the plurality of polarization separation films and the plurality of reflection films are alternately disposed on interfaces of the transmissive plates, when the plurality of first transmissive plates and the plurality of second transmissive plates are alternately disposed and bonded together;

(d) producing a composite plate, having the plurality of polarization separation films and the plurality of reflection films alternately disposed on each of the interfaces of each of the transmissive plates, as a result of alternately disposing and bonding together the plurality of first transmissive plates and the plurality of second transmissive plates; and (e) producing a transmissive block having a light-incident surface and a light-exiting surface, formed parallel to cut surfaces formed by cutting the composite plate along cutting planes parallel to planes at a predetermined angle from planar surfaces of the composite plate;

wherein the step (d) includes the step of forming the polarization separation films so that a transmittance ratio of each polarization separation film, for an ultraviolet light beam of a particular wavelength region, incident on a surface of each polarization separation film at an angle of incidence of approximately 0 degrees, is approximately 40% or more.

According to the above-described first producing method, the transmittance ratio of each polarization separation film for an ultraviolet light beam can be increased, so that, in step (d), an optical adhesive used to bond the first transmissive plates and the second transmissive plates can be efficiently irradiated with ultraviolet light beams, making it possible to decrease the number of man-hours required to cure the adhesive. Therefore, the polarization conversion element can be produced with high efficiency.

It is preferable that the particular wavelength region lie in a range of 365 nm±30 nm.

It is preferable that the step of forming the polarization separation films include the step of forming multilayered structural sections formed by alternately placing first and second layers upon each other, with a refractive index of each first layer being smaller than a refractive index of each transmissive member and a refractive index of each second layer being greater than the refractive index of each transmissive member; the refractive index of each transmissive member be approximately 1.48 to approximately 1.58; and the first layers of the polarization separation films each be formed of $MgF_2$, and the second layers of the polarization separation films each be formed of MgO.

By forming the polarization separation films as described above, each polarization separation film can have a transmittance ratio for an ultraviolet light beam of a particular wavelength range of approximately 40% or more.

In the first producing method, it is preferable that the step (d) comprise the step of forming the reflection films so that a transmittance ratio of each reflection film for an ultraviolet light beam of a particular wavelength region incident to a surface of each reflection film at an angle of incidence of approximately 0 degrees is approximately 40% or more.

According to the foregoing description, the transmittance ratio of each reflection film for an ultraviolet light beam can be increased, so that, in step (d), the optical adhesive used to bond the first transmissive plates and the second transmissive plates together can even be more efficiently irradiated with ultraviolet light beams, making it possible to further decrease the number of man-hours required to cure the adhesive. Therefore, the polarization conversion element can be produced with even higher efficiency.

It is preferable that the particular wavelength region lie in a range of 365 nm±30 nm.

It is preferable that the step of forming the reflection layers include the step of forming multilayered structural sections formed by alternately placing third and fourth layers upon each other, with a refractive index of each third layer being smaller than a refractive index of each transmissive member and a refractive index of each fourth layer being greater than the refractive index of each transmissive member; each transmissive member have a refractive index of approximately 1.48 to approximately 1.58; and the third layers of the reflection films each be formed of $SiO_2$, and the fourth layers of the reflection films each be formed of $TiO_2$ or $Ta_2O_5$.

By forming the reflection films as described above, the transmittance ratio of each reflection film for an ultraviolet beam in a particular wavelength region can be approximately 40% or more.

A second producing method in accordance with the present invention is a method of producing a polarization conversion element that converts an unpolarized light beam incident thereto to a predetermined polarized light beam, the method comprising the steps of:

(a) providing a plurality of first transmissive plates;

(b) providing a plurality of second transmissive plates;

(c) forming a plurality of polarization separation films and a plurality of reflection films on surfaces of portions of the first transmissive plates or the second transmissive plates, so that the plurality of polarization separation films and the plurality of reflection films are alternately disposed on interfaces of the transmissive plates, when the plurality of first transmissive plates and the plurality of second transmissive plates are alternately disposed and bonded together;

(d) producing a composite plate having the plurality of polarization separation films and the plurality of reflection films alternately disposed on each of the interfaces of each of the transmissive plates as a result of alternately disposing and bonding together the plurality of first transmissive plates and the plurality of second transmissive plates; and (e) producing a transmissive block having a light-incident surface and a light-exiting surface, formed parallel to cut surfaces formed by cutting the composite plate along cutting planes parallel to planes at a predetermined angle from planar surfaces of the composite plate;

wherein the step (d) includes the step of forming the reflection films so that a transmittance ratio of each reflection film, for an ultraviolet light beam of a particular wavelength region, incident on a surface of each reflection film at an angle of incidence of approximately 0 degrees, is approximately 40% or more.

According to the second producing method, the transmittance ratio of each reflection film for an ultraviolet light beam can be made high, so that, in step (d), the optical adhesive used to bond the first transmissive plates and the second transmissive plates can be efficiently irradiated with ultraviolet light beams, making it possible to decrease the number of man-hours required to cure the adhesive. Therefore, the polarization conversion element can be produced with high efficiency.

A first polarization conversion element in accordance with the present invention comprises:

a plurality of transmissive members arranged along a predetermined direction; and a plurality of polarization separation films and a plurality of reflection films alternately disposed between the plurality of transmissive members;

wherein a transmittance ratio of each polarization separation film for an ultraviolet light beam of a particular wavelength region, incident on a surface of each polarization separation film at an angle of incidence of approximately 0 degrees, is approximately 40% or more.

The above-described first polarization conversion element comprises polarization separation films each having a high transmittance ratio for an ultraviolet light beam of a particular wavelength region, so that the polarization conversion element can be produced with high efficiency.

It is preferable that, in the first polarization conversion element, a transmittance ratio of each reflection film for an ultraviolet light beam of a particular wavelength region incident to a surface of each reflection film at an angle of incidence of approximately 0 degrees be approximately 40% or more.

The first polarization conversion element comprises reflection films each having a high transmittance ratio for an ultraviolet light beam of a particular wavelength region, so that the polarization conversion element can be produced with even higher efficiency.

A second polarization conversion element in accordance with the present invention comprises:

a plurality of transmissive members arranged along a predetermined direction; and a plurality of polarization separation films and a plurality of reflection films alternately disposed between the plurality of transmissive members;

wherein a transmittance ratio of each reflection film for an ultraviolet light beam of a particular wavelength region, incident to a surface of each reflection film at an angle of incidence of approximately 0 degrees, is approximately 40% or more.

The second polarization conversion element comprises refractive films each having a high transmittance ratio for an ultraviolet light beam of a particular wavelength region, so that the polarization conversion element can be produced with high efficiency.

A first projector in accordance with the present invention comprises:

a light source from where an unpolarized light beam exits;

a polarization conversion element that converts the light beam from the light source into a predetermined polarized light beam;

a light modulation device that modulates the light beam which exits from the polarization conversion element based on a provided image signal; and a projection optical system that projects the light beam modulated by the light modulation device;

wherein the polarization conversion element comprises:

a plurality of transmissive members arranged along a predetermined direction; and a plurality of polarization separation films and a plurality of reflection films alternately disposed between the plurality of transmissive members; and wherein a transmittance ratio of each polarization separation film for an ultraviolet light beam of a particular wavelength region, incident on a surface of each polarization separation film at an angle of incidence of approximately 0 degrees is, approximately 40% or more.

The first projector comprises a first polarization conversion element of the present invention, so that the device can be produced with high efficiency.

A second projector in accordance with the present invention comprises:
   a light source from where an unpolarized light beam exits;
   a polarization conversion element that converts the light beam from the light source into a predetermined polarized light beam; and
   a light modulation device that modulates the light beam which exits from the polarization conversion element based on a provided image signal; and
   a projection optical system that projects the light beam modulated by the light modulation device;
   wherein the polarization conversion element comprises:
   a plurality of transmissive members arranged in a predetermined direction; and
   a plurality of polarization separation films and a plurality of reflection films alternately disposed between the plurality of transmissive members; and
   wherein a transmittance ratio of each reflection member for an ultraviolet light beam of a particular wavelength region, incident on a surface of each reflection film at an angle of incidence of approximately 0 degrees is, approximately 40% or more.

The above-described second projector comprises a second polarization conversion element of the present invention, so that the device can be produced with high efficiency.

BRIEF DESCRIPTION OF THE DRAWINGS

FIG. 6 shows the thickness of each layer of the polarization separation film 331 of FIG. 5.

FIG. 8 shows the thickness of each layer of a reflection film 332.

FIGS. 12(A) and 12(B) illustrate the structure of a comparative-example polarization separation film and that of a comparative-example reflection film respectively, used in a conventional polarization conversion element.

FIG. 17 illustrates another structure of the reflection film 332.

DETAILED DESCRIPTION OF PREFERRED EMBODIMENTS

A. Structure of a Polarization Conversion Element

Figure 1A:
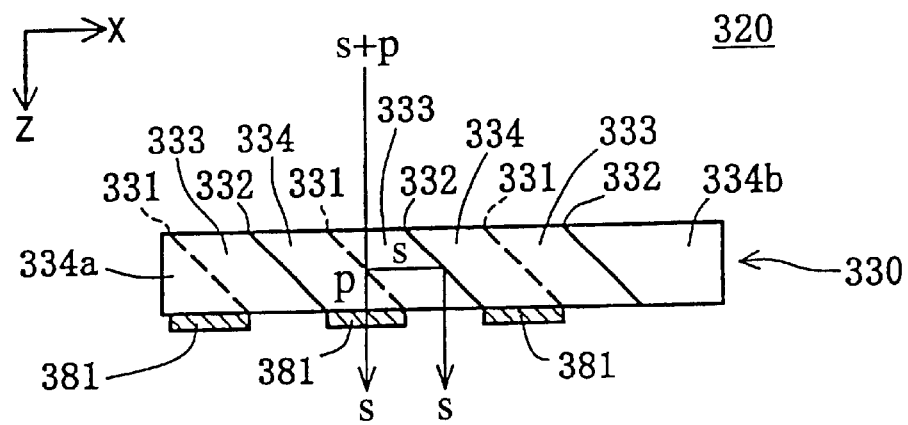
FIGS. 1(A) and 1(B) illustrate a polarization conversion element 320 in accordance with the present invention.
Figure 1B:
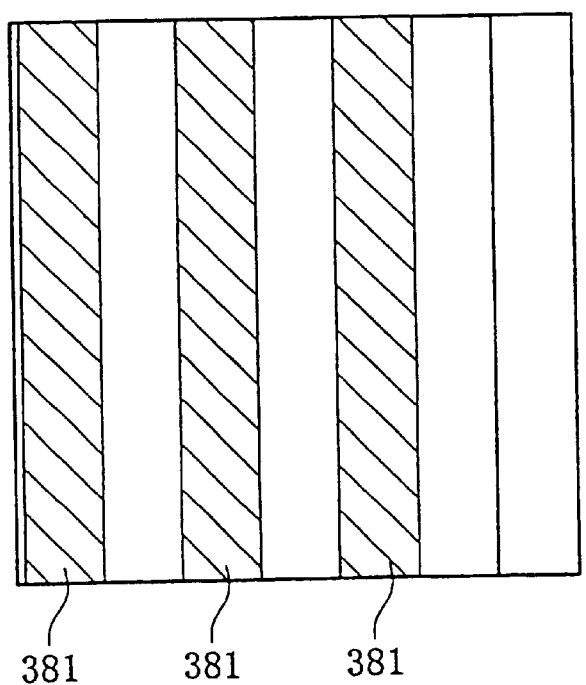

FIGS. 1(A) and 1(B) illustrate a polarization conversion element 320 in accordance with the present invention. FIG. 1(A) is a plan view of the polarization conversion element 320, and FIG. 1(B) is a front view of the polarization conversion element 320. The polarization conversion element 320 includes a polarization separation element 330 and a plurality of λ/2 retardation plates 381 selectively disposed at portions of a light-exiting surface of the polarization separation element 330.

The polarization separation element 330 has a shape formed by alternately bonding first transmissive members 333 and second transmissive members 334, which are columnar members that are parallelogrammic in section. A third transmissive member 334a and a fourth transmissive member 334b, which are columnar members that are trapezoidal in section, are bonded to both ends of the polarization separation element 330. A plurality of polarization separation films 331 and a plurality of reflection films 332 are alternately formed on interfaces of the transmissive members 333, 334, 334a, and 334b. Each λ/2 retardation plate 381 is selectively disposed on an image portion of a light-exiting surface in an x direction of either its corresponding polarization separation film 331 or reflection film 332. In this embodiment, each λ/2 retardation plate 381 is selectively disposed on the image portion in the x direction of the light-exiting surface of its corresponding polarization separation film 331. The third and fourth transmissive members 334a and 334b may have the same shape as the second transmissive members 334, that is, they may be columnar members which are parallelogrammic in section. They may also be columnar members having a substantially right-angled triangular section.

When an unpolarized light beam strikes any one of the polarization separation films 331 of the polarization conversion element 320 of FIG. 1(A), the unpolarized light beam is separated into an s-polarized light beam and a p-polarized light beam by the corresponding polarization separation film 331. The s-polarized light beam is reflected by the corresponding polarization separation film 331. Then, it is further reflected by the corresponding reflection film 332, and leaves therefrom. On the other hand, the p-polarized light beam passes through the polarization separation film 331. The corresponding λ/2 retardation plate 381 is disposed on an exiting plane of the p-polarized light beam which has passed through the polarization separation film 331, so that the p-polarized light beam is converted into an s-polarized light beam, and the resulting s-polarized light beam leaves therefrom. Therefore, almost all of the light beam incident to the polarization separation film 331 of the polarization conversion element 320 leaves it as s-polarized light beams. When one wants the light beam exiting the polarization conversion element to be a p-polarized light beam, the corresponding retardation plate 381 is disposed on an exiting plane of an s-polarized light beam reflected by the corresponding reflection film 332.

B. Method of Producing the Polarization Conversion Element

Figure 2A:
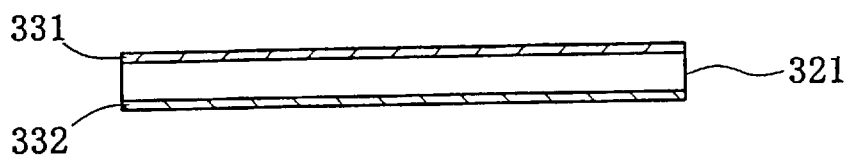
FIGS. 2(A), 2(B) and 2(C) illustrate a method of producing a polarization separation element 330.
Figure 2B:
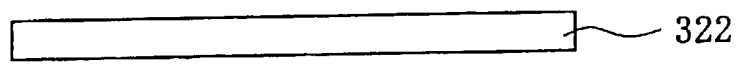

FIG. 2 illustrates a method of producing the polarization separation element 330. As shown in FIGS. 2(A) and (B), a plurality of first transmissive members 321 and a plurality of second transmissive plates 322 are made available. A polarization separating film 331 is formed on one of the surfaces of each first transmissive plate 321, while a reflection film 332 is formed on the other of the surfaces thereof. The polarization separation films 331 and the reflection films 332 are described in more detail below.

Figure 2C:
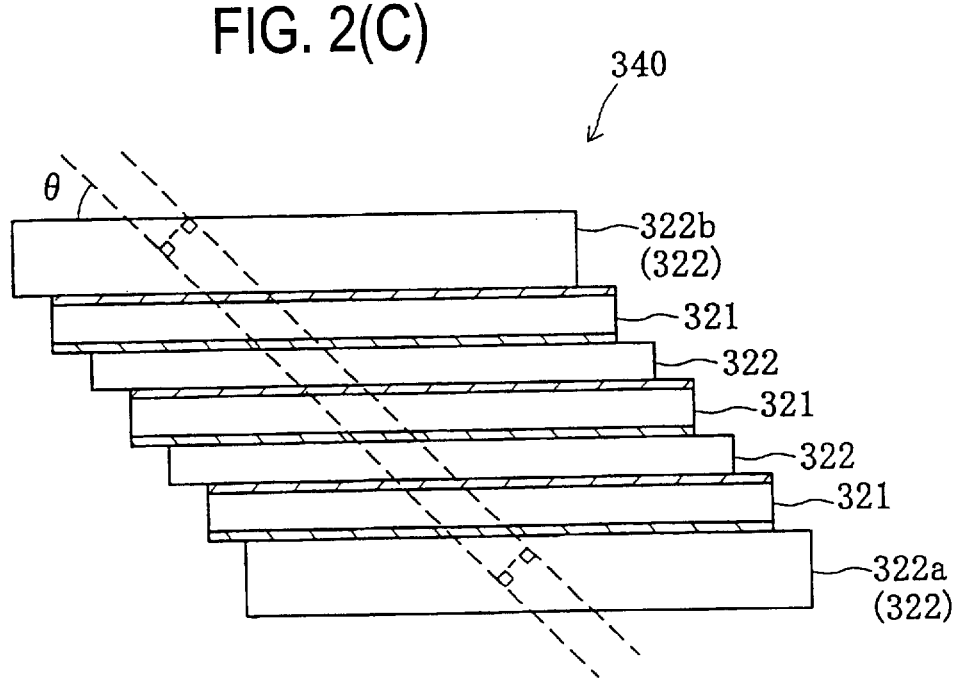

Then, the first transmissive plates 321 and the second transmissive plates 322 are alternately bonded together so that the polarization separation films 331 and the reflection films 332 are alternately disposed in order to produce a composite plate 340 shown in FIG. 2(C). At the beginning and end of the bonding process, transmissive plates which are thicker than the first transmissive plates 321 and the second transmissive plates 322 may be used. In FIG. 2(C), third and fourth transmissive plates 322a and 322b are used. The transmissive plates 322a and 322b are thicker than the first transmissive plates 321 and the second transmissive plates 322, and are the same as the second transmissive plates 322 in that they do not have anything formed on their surfaces. Therefore, it can be said that the third and fourth transmissive plates 322a and 322b functionally act as second transmissive plates. Hereunder, the term second transmissive member 322 may be used to refer to the third and fourth transmissive plates 322a and 322b.

Considering the thickness of the adhesive used in bonding, it is preferable that plates which are slightly thinner than the first transmissive plates 321 are used for the second transmissive plates 322. The thicknesses of the first transmissive plates 321 and those of the second transmissive plates 322 differ by a few percent or less.

As shown in FIG. 2(C), when the composite plate 340 formed in the above-described way is cut out along cutting planes (shown by broken lines in the figure) which are substantially parallel to each other and which extend at a predetermined angle θ from planar surfaces of the composite plate 340, a transmissive block is cut out. It is preferable that θ be approximately 45 degrees. Here, the "planar surfaces of the composite plate" correspond to the planar surfaces of the third and fourth transmissive plates 322a and 322b, respectively, which are bonded at both ends. The protruding portions at both ends are cut into substantially rectangular parallelepiped shapes. By polishing the surfaces (or the cut surfaces) of the cut out transmissive block, the polarization separation element 330 (in FIG. 1) can be obtained. The first transmissive plates 321 correspond to the first transmissive members 333, while the second transmissive plates 322 correspond to the second transmissive plates 334. The third transmissive plate 322a corresponds to the third transmissive member 334a, while the fourth transmissive plate 322b corresponds to the fourth transmissive member 334b.

The first transmissive plates 321 and the second transmissive plates 322 are bonded as follows. FIGS. 3(A)–3(D) illustrate the bonding of the first transmissive plates 321 and the second transmissive plates 322.

Figure 3A:
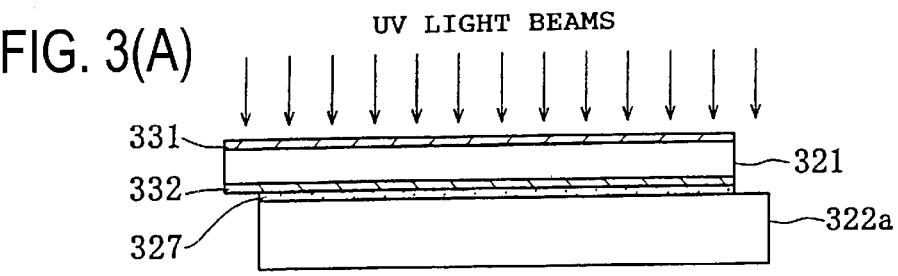
FIGS. 3(A), 3(B), 3(C) and 3(D) illustrate the bonding of first transmissive plates 321 and second transmissive plates 322.

As shown in FIG. 3(A), a first transmissive plate 321 is bonded onto the third transmissive plate 322a with optical adhesive 327. Here, the bonding is carried out by making the side of the first transmissive plate 321 where the reflection film 332 is formed face downward. The optical adhesive 327 which has not yet been cured is irradiated with ultraviolet light (UV) beams through the polarization separation film 331, the first transmissive plate 321, and the reflection film 332 in order to cure the optical adhesive 327.

Figure 3B:
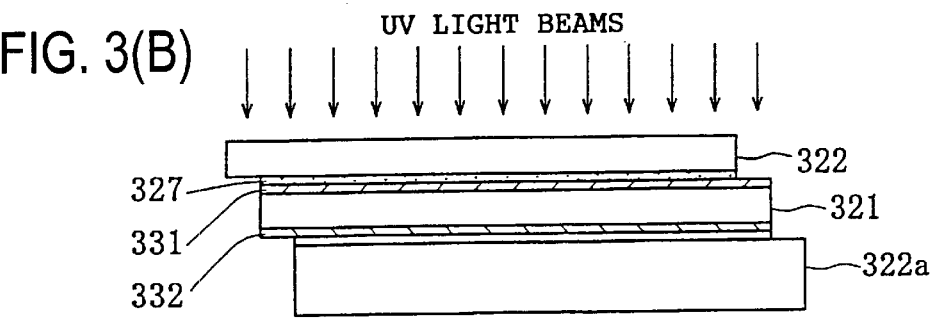

Next, as shown in FIG. 3(B), using optical adhesive 327, a second transmissive plate 322 is bonded onto the first transmissive plate 321 which has been bonded as shown in FIG. 3(A). As in FIG. 3(A), the optical adhesive 327 which has not yet been cured is irradiated with ultraviolet light beams through the second transmissive plate 322 in order to cure the optical adhesive 327.

Figure 3C:
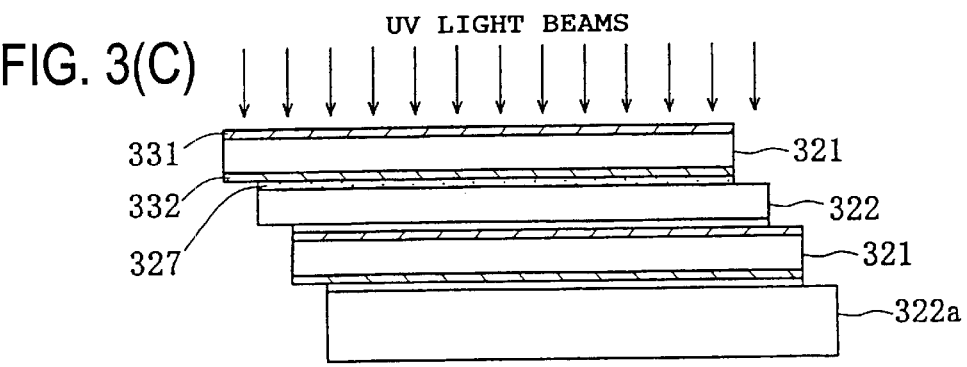

As shown in FIG. 3(C), using optical adhesive 327, another first transmissive plate 321 is, as in FIG. 3(A), bonded onto the second transmissive plate 322, which has been bonded as shown in FIG. 3(B).

Figure 3D:
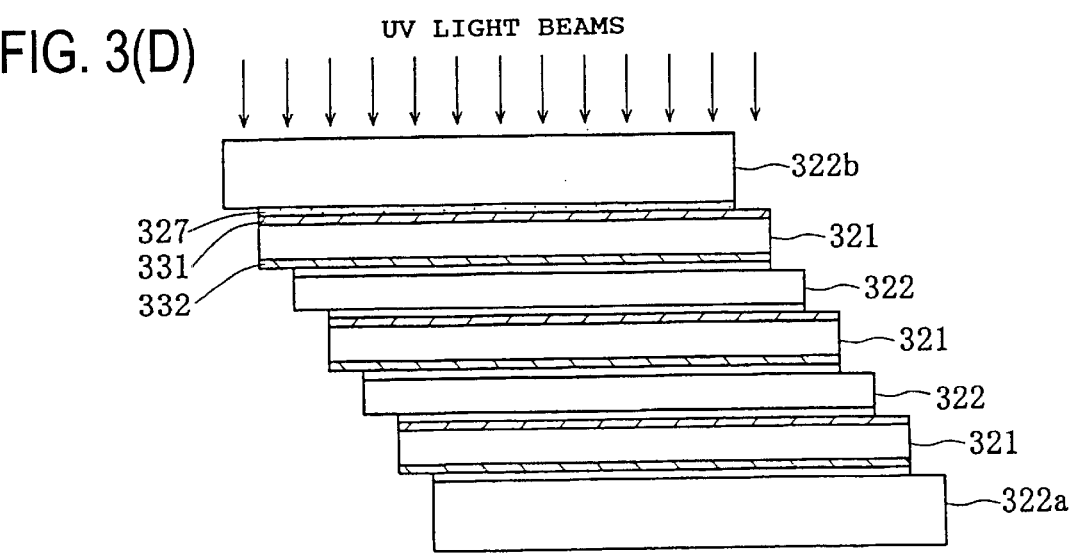

By repeating the bonding steps illustrated in FIGS. 3(B) and 3(C), the first transmissive plates 321 and the second transmissive plates 322 are bonded together, respectively. Lastly, as shown in FIG. 3(D), the fourth transmissive plate 322b is bonded in a way similar to that shown in FIG. 3(B). By performing the above-described steps, the composite plate 340 shown in FIG. 2(C) is produced.

In the example shown in FIGS. 3(A)–3(D), the bonding is started from the third transmissive plate 322a side. However, it may be started from the fourth transmissive plate 322b side. Ultraviolet light beams may be irradiated from the third transmissive plate 322a side.

Figure 4A:
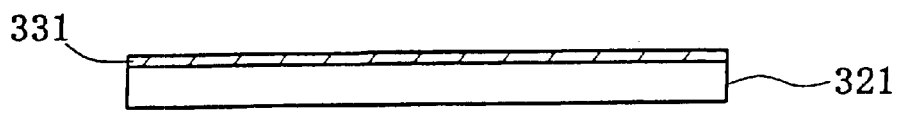
FIGS. 4(A), 4(B) and 4(C) illustrate another method of producing the polarization separation element 330.
Figure 4B:
Figure 4C:
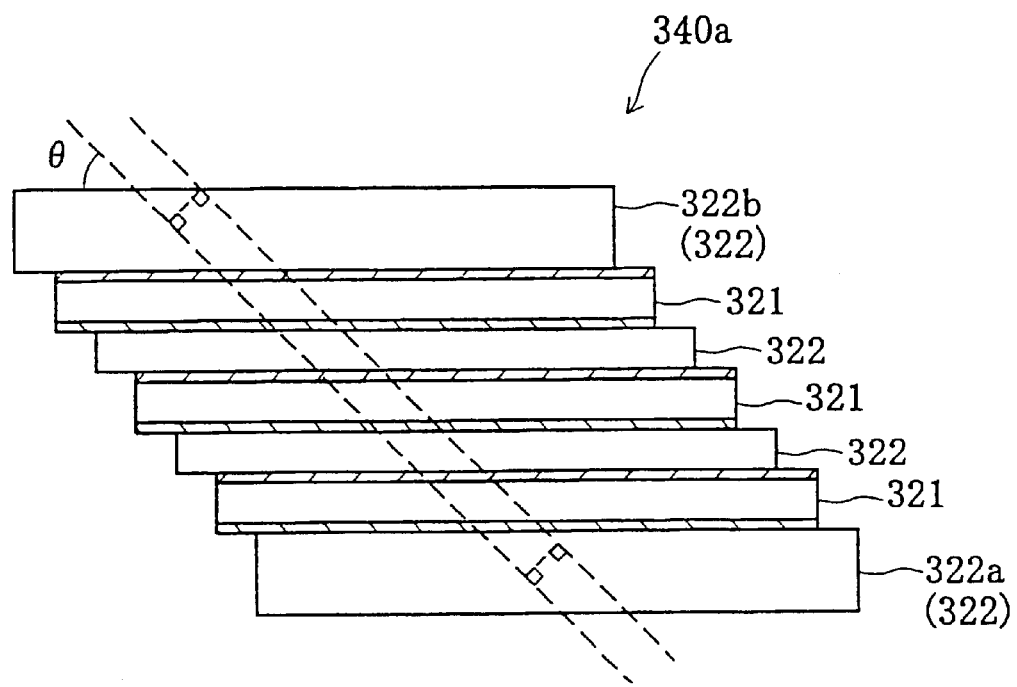

FIGS. 4(A)–4(C) illustrate another method of producing the polarization separation element 330. As in FIGS. 2(A) and (B), in this method, first transmissive plates 321 and second transmissive plates 322 are made available. As shown in FIGS. 4(A) and (B), reflection films 332 are formed at sides of corresponding second transmissive plates 322 to which the reflection films 332 are bonded by the bonding step shown in FIG. 3. As shown in FIG. 4(C), the first transmissive plates 321 and the second transmissive plates 322 are alternately bonded in order to produce a composite plate 340a formed in such a way that the polarization separation films 331 and the reflection films 332 are alternately disposed.

When the composite plate 340a produced in this way is, as in FIG. 2(C), cut along cutting planes (indicated by broken lines in the figure) which are substantially parallel to each other and which extend at a predetermined angle θ from planar surfaces thereof, the protruding portions at both ends are cut into a substantially rectangular parallelepiped shape, and the surfaces (that is, cut surfaces) are polished, so that a polarization separation element 330' similar to the polarization separation element 330 can be produced.

In this example, the first transmissive plates 321 and the second transmissive plates 322 can be bonded in a way similar to the way the first and second transmissive plates are bonded in FIG. 3.

C. Structure of the Polarization Separation Films and Reflection Films

Figure 5:
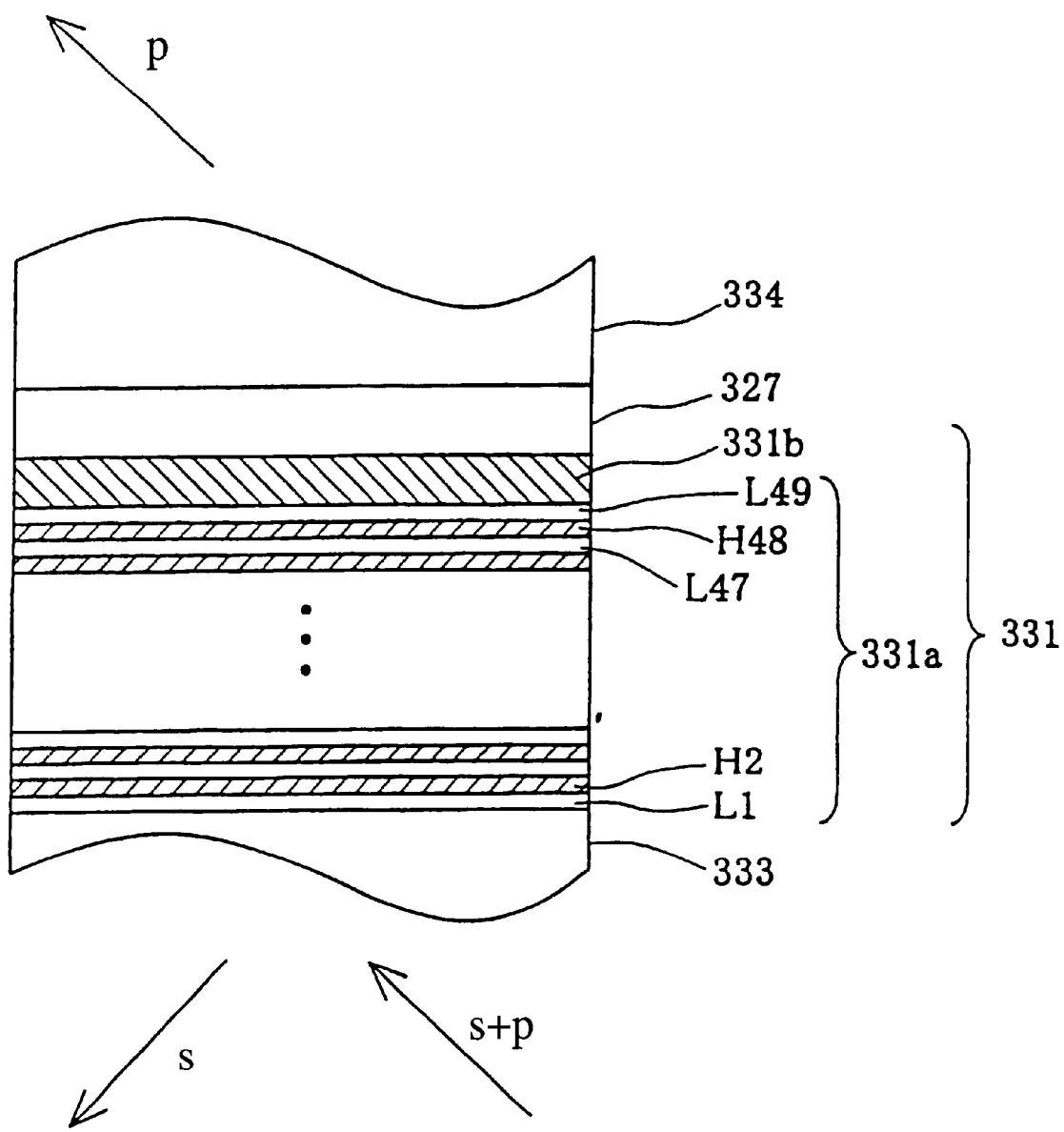
FIG. 5 is an enlarged sectional view of the polarization separation film 331.

FIG. 5 is an enlarged sectional view of a polarization separation film 331. The polarization separation film 331 is a dielectric multilayered film formed on the corresponding first transmissive member 333, and includes a multilayered structural section 331a in which two types of materials are alternately placed upon each other so that 49 layers are formed, and a covering layer 331b formed on the multilayered structural section 331a. The polarization separation film 331 is formed by successively placing its layers one layer at a time onto the surface of the corresponding first transmissive plate 321 which corresponds to the first transmissive member 333. The first transmissive member 333 onto which the layers of the polarization separation film 331 have been placed, is bonded to the corresponding second transmissive member 334 (that is, the second transmissive plate 322) or the third transmissive member 334a (that is, the third transmissive plate 322a) with optical adhesive 327. FIG. 5 illustrates the case where it is bonded to the second transmissive member 334. The covering layer 331b functions to increase an adhesive property between the polarization separation film 331 and the second transmissive member 334.

The multi-layered structural section 331a comprises a laminated structure of layers (hereunder called layers L) which are formed on the first transmissive member 333 with a refractive index of approximately 1.5 and which have relatively small refractive indices compared to that of the first transmissive member 333, and layers (hereunder called layers H) with relatively large refractive indices. In the example of FIG. 5, a total of 49 layers, L1, H2, L3, H4, ... L47, H48, and L49, are formed. The covering layer 331b has a refractive index which is substantially intermediate between those of the materials of the layers H and the layers L. Various materials with refractive indices of about 1.48 to 1.58 may be used to form the transmissive members 333, 334, 334a, and 334b, so that, for example, a white transmissive plate with a refractive index of approximately 1.52, or an optical glass such as BK7-S (product of Schott) may be used. $MgF_2$ with a refractive index of approximately 1.38 is used as a material for the layers L of the polarization separation film 331, whereas MgO having a refractive index of approximately 1.73 is used as a material for the layers H. $SiO_2$ with a refractive index of approximately 1.44 is used as a material for the covering layer 331b. It is known that the refractive index of each layer changes as a result of, for example, absorption of moisture in the atmosphere. In the specification, the "refractive index" is maintained in a state in which the polarization separation film 331 is exposed to the atmosphere for a long period of time.

FIG. 6 shows the thickness of each layer of the polarization separation film 331 shown in FIG. 5. The structure thereof is used when a design wavelength $\lambda$ is 600 nm. The design wavelength $\lambda$ is the initial set value when a film is being designed, and the thickness of each layer is determined so that a required transmission/reflection characteristic can be obtained at this design wavelength. As the design wavelength $\lambda$, a wavelength of a primary light component used in the optical element is selected. The polarization conversion element 320 of the embodiment is used to convert the polarizations of three color light beams, R, G, and B light beams, and here, a wavelength near the wavelength of red light (that is, 600 nm) is selected as the design wavelength. In FIG. 6, value D in the right column represents a value obtained by dividing the optical thickness of each layer (that is, the thickness obtained by multiplying the refractive index n of each material of each layer to the actual film thickness d of each layer) by ¼th the design wavelength $\lambda$. Therefore, each actual film thickness d is a value obtained by multiplying its corresponding value D by $\lambda/4$ and dividing the product by its corresponding refractive index n. Here, for each layer L, the refractive index of each layer L is used for the refractive index n thereof, whereas, for each layer H, the refractive index of each layer H is used for the refractive index n thereof. As shown in FIG. 3, although the optical thickness of each layer of the multilayered structural section 331a is of the order of $\lambda/4$, different values may be used. Only the optical thickness of the covering layer 331b is $3 \cdot (\lambda/4)$.

Figure 7:
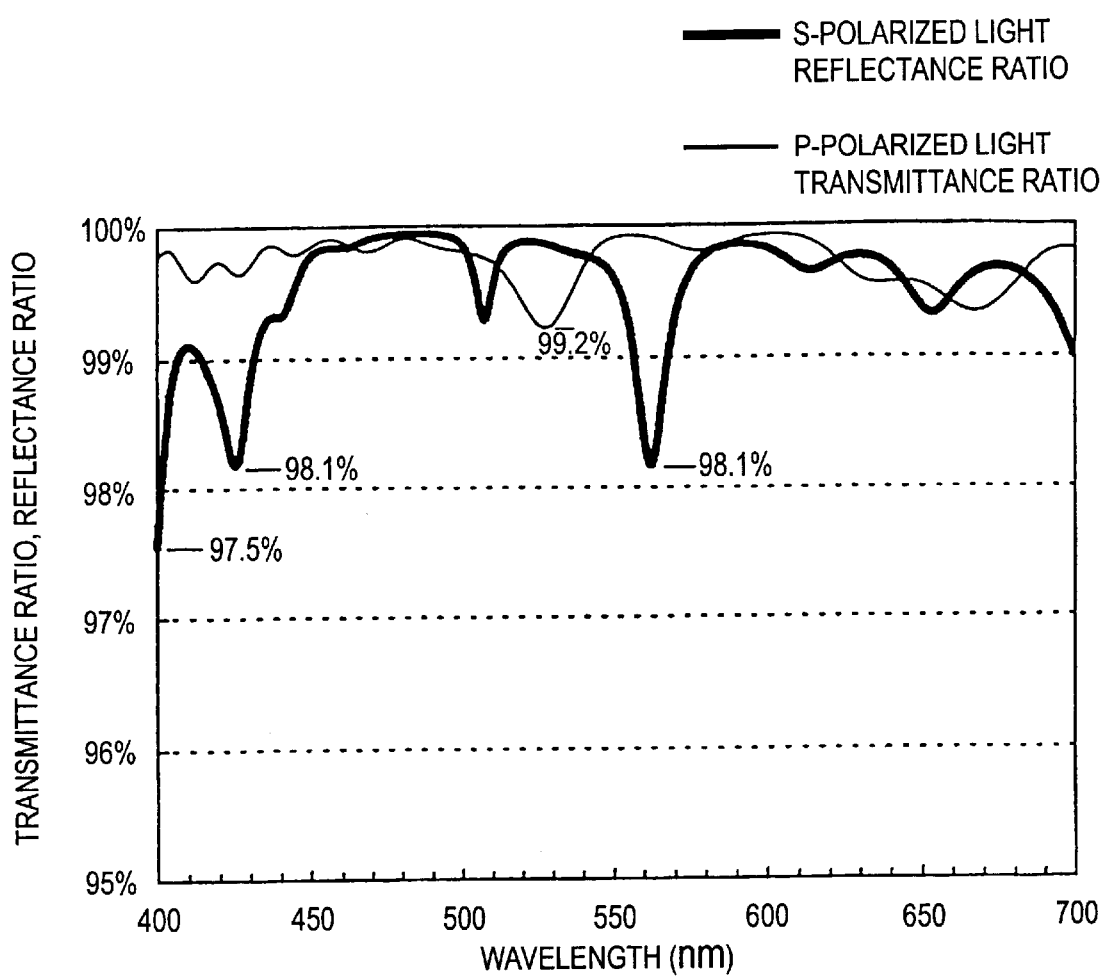
FIG. 7 illustrates a graph showing simulation results of optical characteristics of the polarization separation film 331 having the structure of FIG. 6.

FIG. 7 is a graph showing simulation results of optical characteristics of the polarization separation film 331 having the structure of FIG. 6. In the wavelength range of 400 to 700 nm, the refractive index of each layer changes by an amount of the order of 0.1. The simulation results of FIG. 7 are values obtained by solving each film characteristic matrix while considering the wavelength characteristic of the refractive index of each layer.

As shown in FIG. 7, in the visible wavelength range of from 400 to 700 nm, the polarization separation film 331 is such that the transmittance ratio of a p-polarized light beam at an angle of incidence of approximately 45 degrees is at least 99.2%, while the reflectance ratio of an s-polarized light beam is at least 97.5%. The covering layer 331b is disposed to increase the adhesive property between the multilayered structural section 331a and the second transmissive member 334, so that it virtually does not affect the optical characteristics of the polarization separation film 331. In other words, even if the covering layer 331b is not disposed, results similar to the simulation results of FIG. 7 can be obtained, so that the covering layer 331b does not have to be disposed. FIG. 7 shows the simulation results obtained when the light beams are incident from the L1 layer side. However, similar results can be obtained when the light beams are incident from the covering layer 331b side.

Like the polarization separation film 331 shown in FIG. 5, the reflection film 332 is also a dielectric multilayered film formed on either the first transmissive member 333 or the second transmissive member 334, and comprises two types of materials alternately placed upon each other.

FIG. 8 shows the thickness of each layer of the reflection film 332. In the structure of FIG. 8, $SiO_2$ with a refractive index of approximately 1.44 is used as a material for the layers L, and $TiO_2$ with a refractive index of approximately 2.266 is used as a material for the layers H. 31 layers, L1, H2, L3, H4, ... H30, L31, are successively placed upon each other in that order on the first transmissive member 333. In the method shown in FIG. 4, they are placed on the second transmissive member 334.

Figure 9:
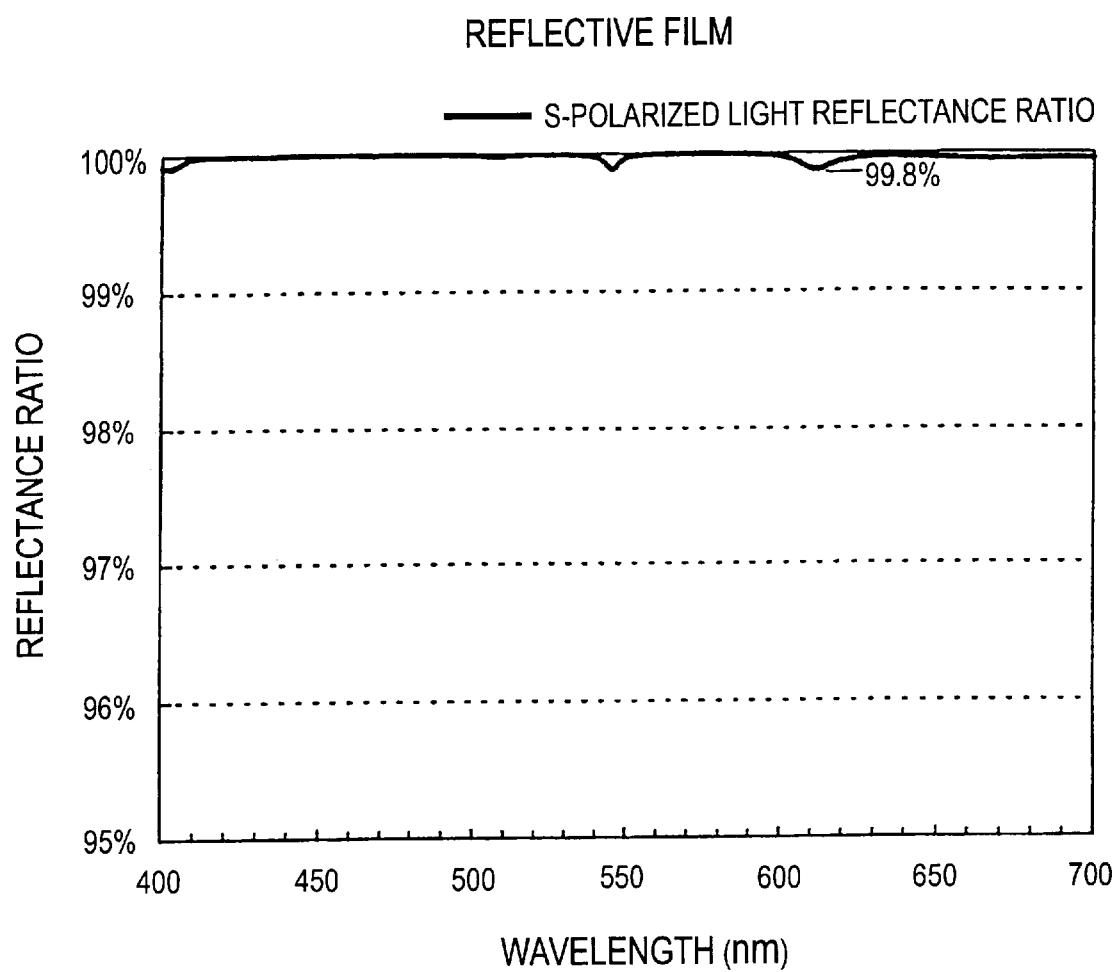
FIG. 9 illustrates a graph showing simulation results of an s-polarized light beam reflection characteristic when the reflection film 332 having the structure of FIG. 8 is used.

FIG. 9 is a graph showing simulation results of the reflection characteristic of an s-polarized light beam when the reflection film 332 having the structure shown in FIG. 8 is used. When the reflection film 332 having the structure shown in FIG. 8 is used, in the visible wavelength range of 400 to 700 nm, it is possible to obtain a reflectance ratio of at least 99.8% for an s-polarized light beam at an angle of incidence of approximately 45 degrees, as shown in FIG. 9. The reflection film 332 produces similar simulation results regardless of whether light beams are incident from the L1 layer side or are incident from the L31 layer side.

In the above-described producing methods, the first and second transmissive plates 321 and 322 corresponding to the respective transmissive members 333 and 334 of the polarization conversion element 320 are bonded with the optical adhesive 327, and, as shown in FIG. 3, the optical adhesive 327 is irradiated with ultraviolet light beams through the polarization separation films 331 and the reflection films 332 in order to be cured. Therefore, it is preferable that the polarization separation films 331 and the reflection films 332 transmit ultraviolet light beams therethrough. In particular, it is preferable that they transmit as much ultraviolet light beams therethrough in order to reduce the time required to carry out the bonding.

Figure 10:
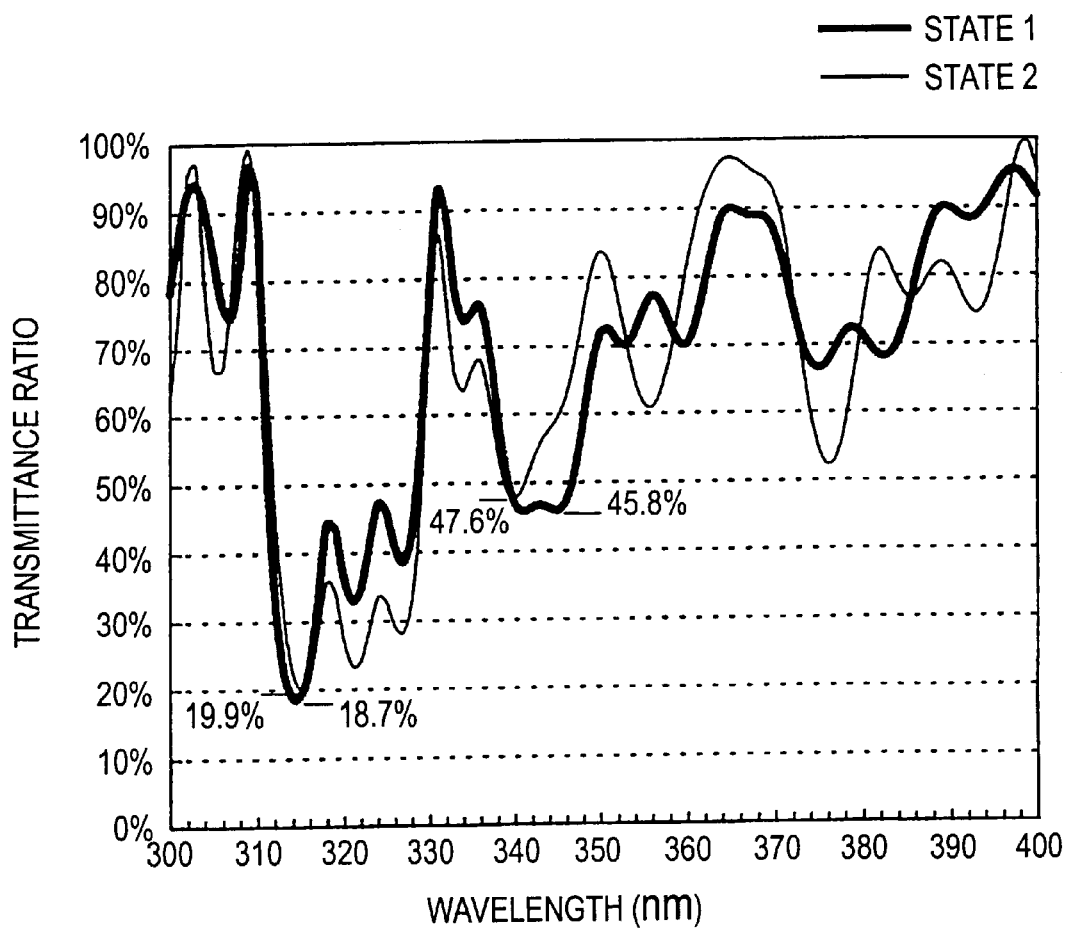
FIG. 10 illustrates a graph showing simulation results of optical characteristics of the polarization separation film 331 in a wavelength range of 300 to 400 nm (that is, in the ultraviolet region).

FIG. 10 is a graph showing simulation results of optical characteristics of the polarization separation film 331 in a wavelength range of 300 to 400 nm (that is, the ultraviolet range). The thick line in FIG. 10 represents the transmittance ratio of the polarization separation film 331 in a state (hereunder referred to as "state 1") where the polarization separation film 331 is sandwiched by its corresponding first transmissive plate 321 and its corresponding second transmissive plate 322, whereas the thin line represents the transmittance ratio of the polarization separation film 331 in a state (hereunder referred to as "state 2") where one side of the polarization separation film is in contact with air. Here, two characteristics in states 1 and 2 are shown due to the following reasons. As shown in FIG. 3, in the bonding of the first transmissive plates 321 and the second transmissive plates 322, the polarization separation films and the reflection films may be sandwiched by their corresponding first transmissive members 321 and second transmissive members 322, or one side thereof may be in contact with air. The transmittance characteristics of the films vary with the media at the interfaces. Therefore, in FIG. 10, the characteristics in the states 1 and 2 are shown.

As can be seen from FIG. 10, when the angle of incidence of light beams in a wavelength range of 300 to 400 nm is approximately 0 degrees, the transmittance ratio is at least 18.7% in the state 1, and at least 19.9% in the state 2. In particular, in a wavelength range of 365±30 nm, the transmittance ratio is at least 45.8% in the state 1, and at least 47.6% in the state 2.

Figure 11:
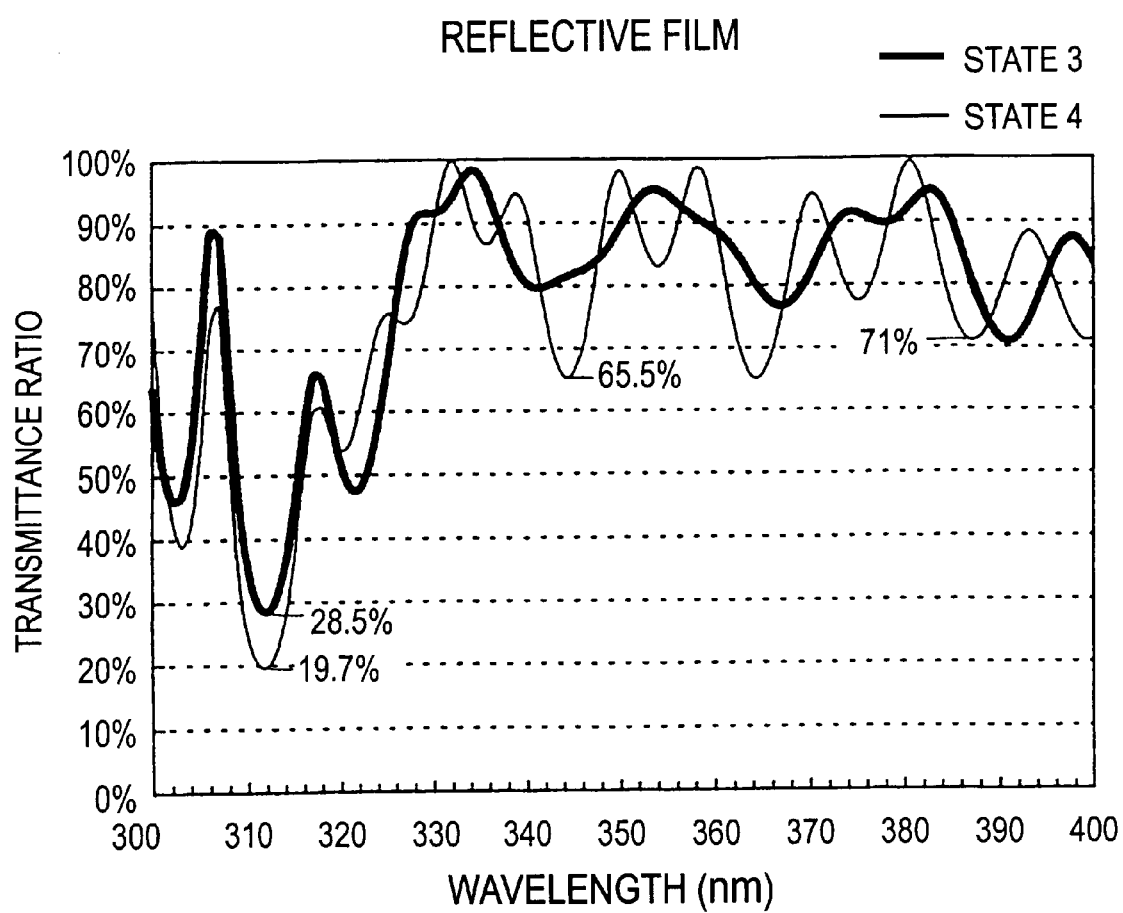
FIG. 11 illustrates a graph showing simulation results of optical characteristics of the reflection film 332 in the wavelength range of 300 to 400 nm.

FIG. 11 is a graph showing simulation results of optical characteristics in the wavelength range of 300 to 400 nm of a reflection film 332. The thick line in FIG. 11 represents the transmittance ratio in a state (hereunder called "state 3") where the reflection film 332 is sandwiched by its corresponding first transmissive plate 321 and second transmissive plate 322, while the thin line represents the transmittance ratio in a state (hereunder called "state 4") where one side of the reflection film is in contact with air.

When the angle of incidence of light beams having a wavelength range of 300 to 700 nm with respective to the reflection film 332 is approximately 0, the light transmittance ratio is at least 28.5% in the state 3, and at least 19.7% in the state 4. In particular, in the wavelength range of 365±30 nm, the transmittance ratio is at least 71.0% in the state 3, and at least 65.5% in the state 4.

FIG. 12 shows the structures of comparative examples of a polarization separation film and a reflection film used in a conventional polarization conversion element. The comparative-example polarization separation film and reflection film are the same as the polarization separation films 331 and the reflection films 332 used in the above-described embodiment except that the thicknesses of the layers are different.

Figure 13:
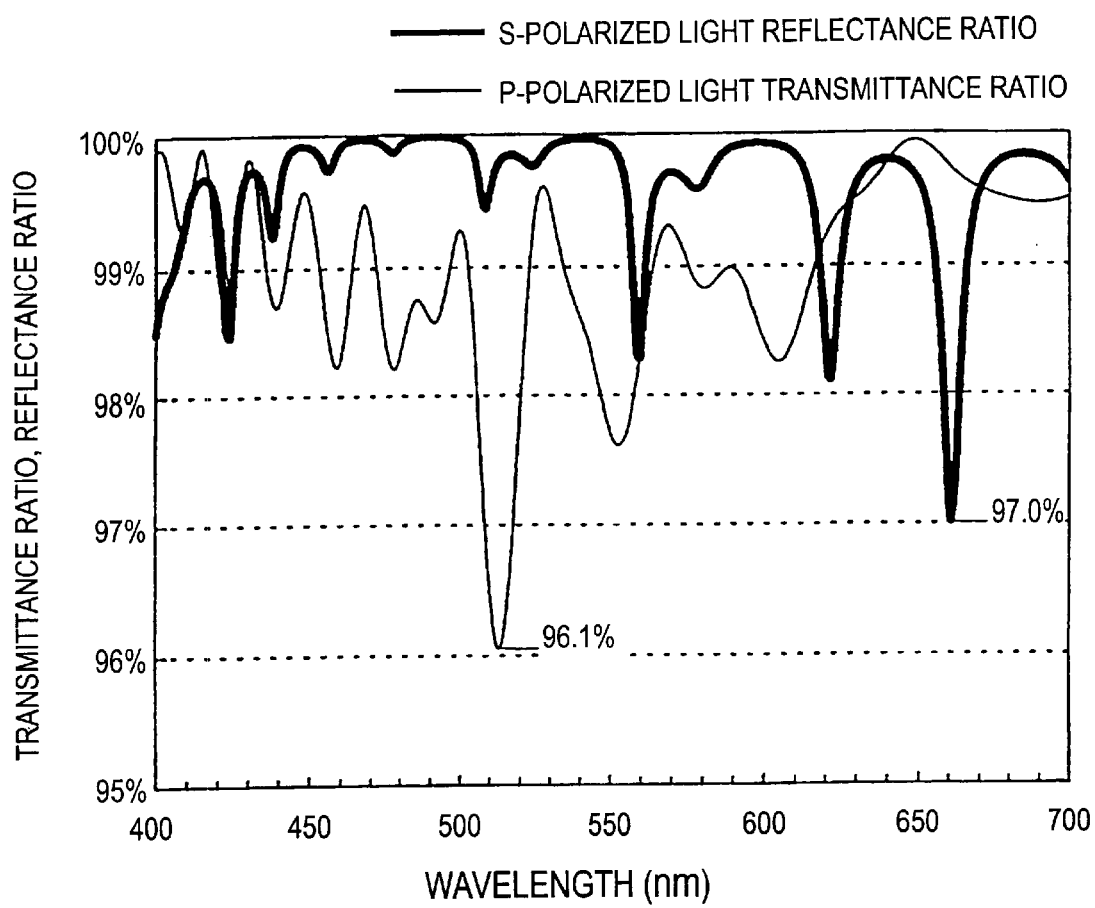
FIG. 13 illustrates a graph showing simulation results of optical characteristics of the comparative-example polarization separation film in a wavelength range of 400 to 700 nm.
Figure 14:
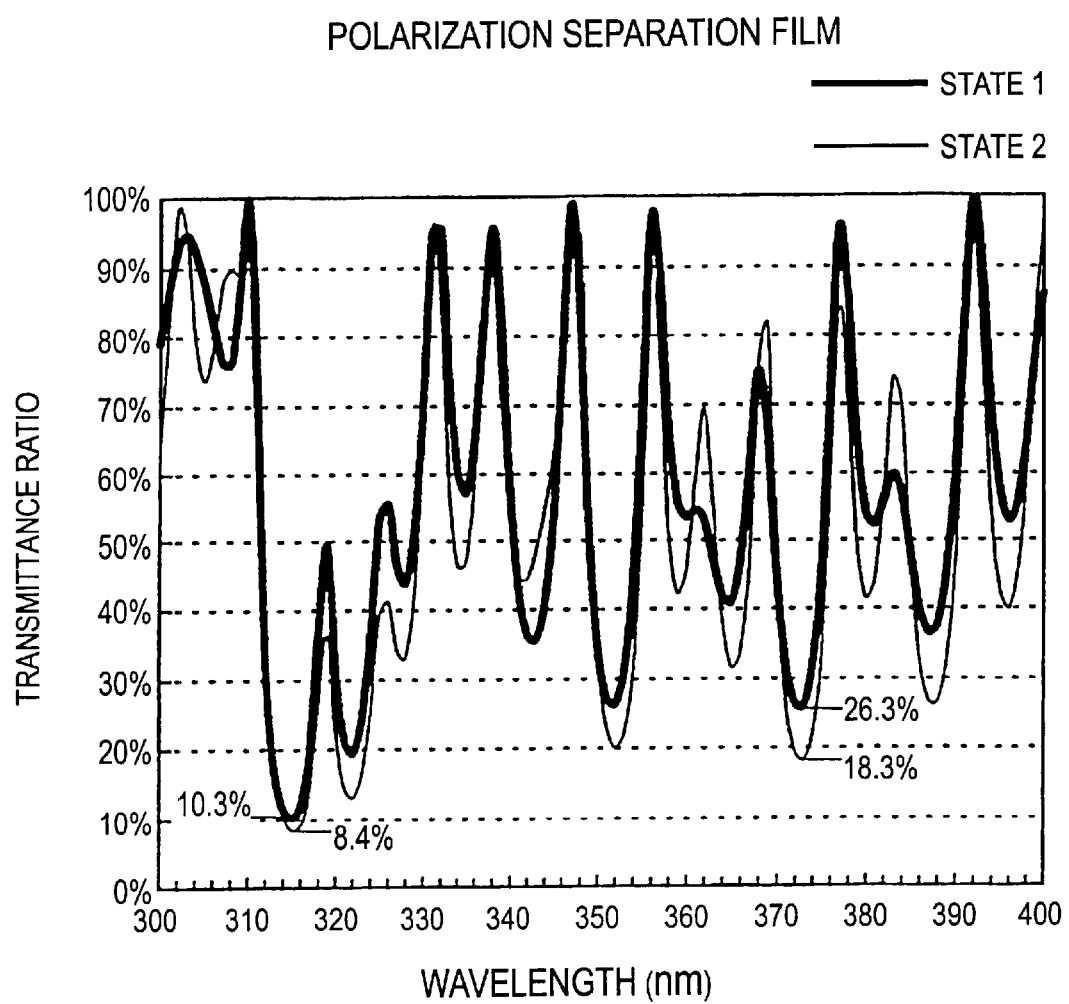
FIG. 14 illustrates a graph showing simulation results of optical characteristics in the wavelength range of 300 to 400 nm.

FIG. 13 illustrates a graph showing simulation results of optical characteristics in the wavelength range of 400 to 700 nm (that is, in the visible range). FIG. 14 illustrates a graph showing simulation results of optical characteristics in the wavelength range of 300 to 400 nm (that is, in the ultraviolet range).

As shown in FIG. 13, the comparative-example polarization separation film is such that, in the visible region, the p-polarized light beam transmittance ratio is at least 96.1%, and the s-polarized light beam reflectance ratio is at least 97.0%. In contrast, as shown in FIG. 7, the polarization separation film 331 used in the embodiment is such that, in the visible region, the p-polarized light beam transmittance ratio is at least 99.2%, and the s-polarized light beam reflectance ratio is at least 98.1%. Therefore, in the visible range, the polarization separation film 331 used in the above-described embodiment has transmission/reflection characteristics which are better than those of the comparative-example polarization separation film. Therefore, like the conventional polarization separation element, the polarization separation element can be constructed to transmit a p-polarized light beam and reflect an s-polarized light in the visible region with high efficiency.

As shown in FIG. 14, the comparative-example polarization separation film is such that, in the wavelength range of 300 to 400 nm (that is, the ultraviolet region), the transmittance ratio of light is at least 10.3% in the state 1, and at least 8.4% in the state 2. In particular, even in the wavelength range of 365±30 nm, it is at least 26.3% in the state 1, and at least 18.3% in the state 2.

In contrast, as shown in FIG. 10, in the wavelength range of 300 to 400 nm, the light transmittance ratio of the polarization separation film 331 used in the above-described embodiment is at least 18.7% in the state 1 and at least 19.9% in the state 2. In particular, in the range of 365±30 nm, the transmittance ratio is at least 45.8% in the state 1 and at least 47.6% in the state 2. Therefore, it can be seen that, in the wavelength range of 300 to 400 nm, the transmittance ratio of the polarization separation film 331 used in the embodiment is at least 1.8 times that of the comparative-example polarization separation film in the state 1, and at least 1.7 times that of the comparative-example polarization separation film in the state 2. It can be seen that, particularly in the wavelength range of 365±30 nm, the transmittance ratio is at least 2.3 times that of the comparative-example polarization separation film in the state 1, and at least 2.6 times that of the comparative-example polarization separation film in the state 2. In other words, the polarization separation film 331 used in the embodiment has greater transmittance ratios in the ultraviolet region than the comparative-example polarization separation film.

As can be understood from the foregoing description, when the polarization separation film 331 used in the embodiment is used, the time required to cure the optical adhesive 327 can be made shorter in the step of bonding the transmissive plates when producing the above-described polarization separation element. This makes it possible to reduce the number of man-hours required to produce the polarization conversion element.

Figure 15:
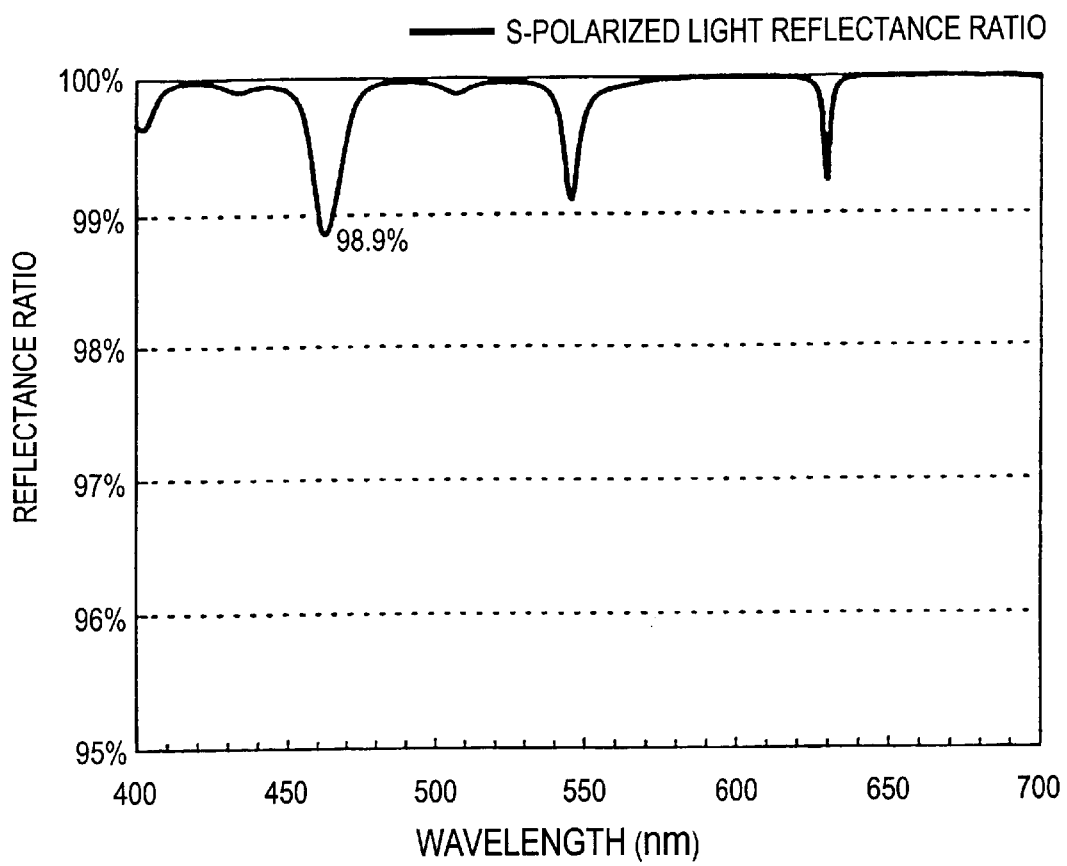
FIG. 15 illustrates a graph showing simulation results of an optical characteristic of the comparative-example reflection film in the wavelength range of 400 to 700 nm.
Figure 16:
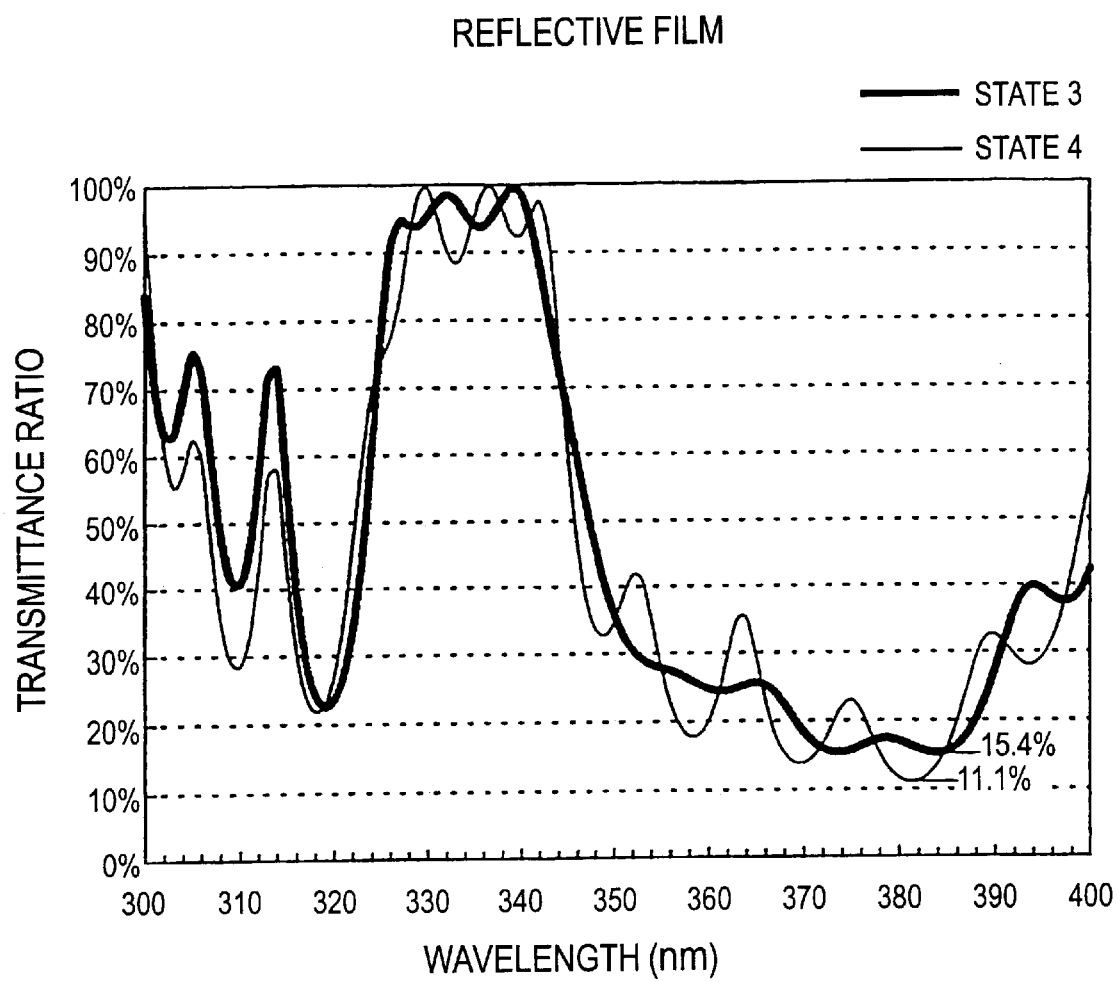
FIG. 16 illustrates a graph showing simulation results of optical characteristics in the wavelength range of 300 to 400 nm.

FIG. 15 illustrates a graph showing simulation results of optical characteristics in the wavelength range of 400 to 700 nm (that is, the visible region) for the comparative-example reflection film. FIG. 16 illustrates a graph showing simulation results of optical characteristics in the wavelength range of 300 to 400 nm (that is, the ultraviolet region).

As shown in FIG. 15, in the visible region, the s-polarized light beam reflectance ratio of the comparative-example reflection film is at least 98.9%. In contrast, as shown in FIG. 9, in the visible region, the s-polarized light beam reflectance ratio of the reflection film 332 used in the embodiment is at least 99.8%. Therefore, in the visible region, the reflection characteristic of the reflection film 332 used in the embodiment is better than that of the comparative-example reflection film. Consequently, as is conventionally the case, a polarization separation element which reflects s-polarized light beams with high efficiency in the visible region can be constructed.

As shown in FIG. 16, in the wavelength range of 300 to 400 nm, the ultraviolet light transmittance ratio of the comparative-example reflection film is at least 15.4% in the state 3 and at least 11.1% in the state 4, and this is also true in the wavelength range of 365±30 nm.

In contrast, as shown in Fig. 11, in the wavelength range of 300 to 400 nm, the light transmittance ratio of the reflection film 332 used in the embodiment is at least 28.5% in the state 3 and at least 19.7% in the state 4. In particular, in the wavelength range of 365±30 nm, it is at least 71.0% in the state 3 and at least 65.5% in the state 4. Therefore, in the wavelength range of 300 to 400 nm, the transmittance ratio of the reflection film 332 used in the embodiment is at least 1.8 times that of the comparative-example reflection film in the state 3 and at least 1.7 times that of the comparative-example reflection film in the state 4. It can be seen that particularly in the wavelength range of 365±30 nm, the transmittance ratio is at least 4.6 times that of the comparative-example reflection film in the state 3 and at least 5.9 times that of the comparative-example reflection film in the state 4. In other words, in the ultraviolet range, the transmittance ratios of the reflection film 332 used in the embodiment are greater than those of the comparative-example reflection film.

Therefore, when the reflection film 332 used in the embodiment is used, the time required to cure the optical adhesive 327 can be made shorter in the step of bonding the transmissive plates when producing the above-described polarization separation element. This makes it possible to reduce the number of man-hours required to produce the polarization conversion element.

As can be understood from the foregoing description, since, in the polarization conversion element 320 used in the embodiment, the transmission characteristics in the ultraviolet region are improved compared to those of a conventional polarization conversion element, while making the usual reflection and transmission characteristics in the visible region comparable to or better than those of the conventional polarization conversion element, it is possible to shorten the length of time required to bond the transmissive plates together during the manufacturing process. This makes it possible to reduce the number of man-hours required to produce the polarization conversion element.

FIG. 17 illustrates another structure of the reflection film 332. In the structure illustrated in FIG. 17, $SiO_2$ with a refractive index of approximately 1.44 is used as a material for the layers L, while $Ta_2O_5$ with a refractive index of approximately 2.18 is used as a material for the layers H. In a reflection film 332A having the structure illustrated in FIG. 17, 31 layers, L1, H2, L3, H4, . . . H30, L31, are placed upon either a first transmissive member 333 or a second transmissive member 334.

Figure 18:
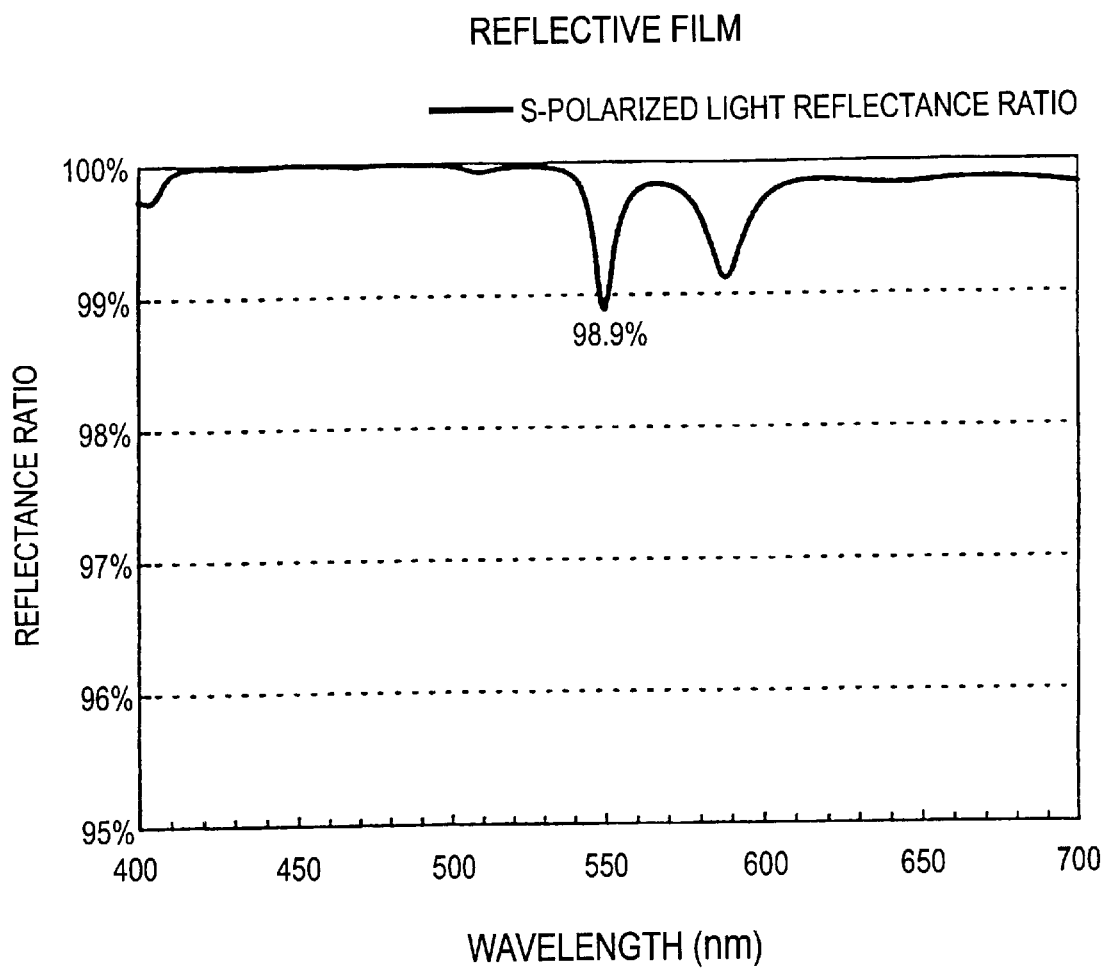
FIG. 18 illustrates a graph showing simulation results of an s-polarized light beam reflection characteristic when a reflection film 332A having the structure of FIG. 17 is used.

FIG. 18 illustrates a graph of simulated results of an s-polarized light beam reflection characteristic when the reflection film 332A having the structure described in FIG. 17 is used. As shown in FIG. 18, when the reflection film 332A is used, the s-polarized light beam reflectance ratio in the visible wavelength range of 400 to 700 nm is at least 98.9%, making it possible to obtain reflectance ratios which are comparable to those of the comparative-example reflection film.

Figure 19:
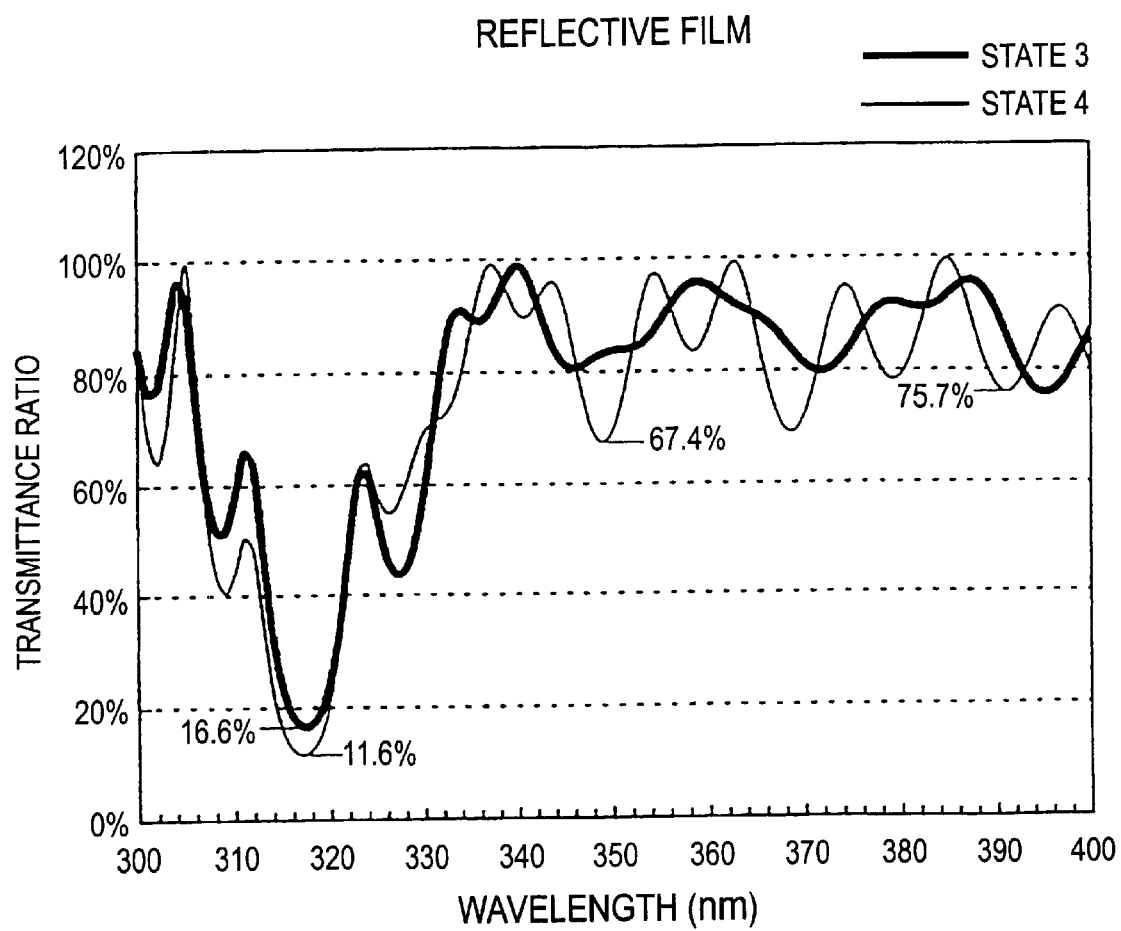
FIG. 19 illustrates a graph showing simulation results of optical characteristics of the reflection film 332A in the wavelength range of 300 to 400 nm.

FIG. 19 illustrates a graph showing simulation results of an optical characteristic of the reflection film 332A in the wavelength range of 300 to 400 nm. In the wavelength range of 300 to 400 nm, the transmittance ratio is at least 16.6% in the state 3 and at least 11.6% in the state 4. Particularly in the wavelength range of 365±30 nm, the transmittance ratio is at least 75.7% in the state 3 and at least 67.4% in the state 4. Therefore, it can be seen that, in the wavelength range of 300 to 400 nm, the transmittance ratio of the reflection film 332A is at least 1.07 times that of the comparative-example reflection film in the state 3 and at least 1.04 times that of the comparative-example reflection film in the state 4. It can be seen that, particularly in the wavelength range of 365±30 nm, the transmittance ratio is at least 4.9 times that of the comparative-example reflection film in the state 3 and at least 6.0 times that of the comparative-example reflection film in the state 4. Even with the reflection film 332A, in the ultraviolet region, a transmittance characteristic which is substantially the same as that of the reflection film 332 (shown in FIG. 11) can be obtained.

Compared to the comparative-example reflection film, in the ultraviolet region, the transmittance ratios of the reflection film 332A are greater. Therefore, it is possible to shorten the time required to cure the optical adhesive 327 in the step of bonding the above-described transmissive plates. Thus, the number of man-hours required to produce the polarization conversion element can be reduced.

The degree of light absorption of $Ta_2O_5$ used to form the reflection film 332A can be made smaller than that of $TiO_2$ used to form the reflection film 332. Therefore, the reflection film used to provide an s-polarized light beam reflectance ratio in the ultraviolet region while maintaining the light transmittance ratios can be easily formed.

D. Structure of a Projector

Figure 20:
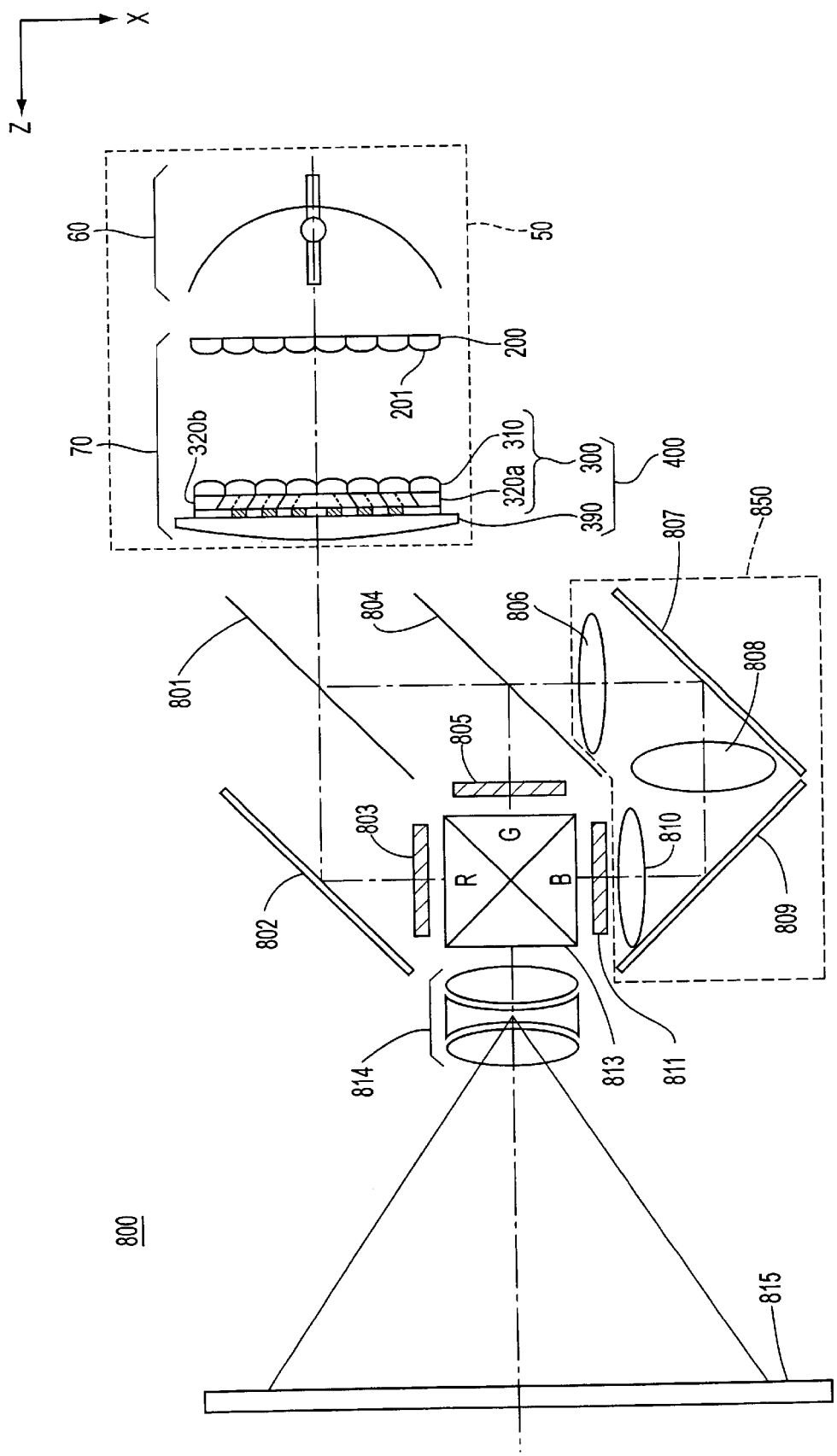
FIG. 20 is a schematic structural view of the main portion of a projector including the polarization conversion element of the present invention.

FIG. 20 is a schematic structural view illustrating the main portion of a projector including the polarization conversion element in accordance with the present invention. A projector 800 comprises a polarization illumination device 50, dichroic mirrors 801 and 804, a reflection mirror 802, 807, and 809, relay lenses 806, 808, and 810, three liquid crystal light valves 803, 805, and 811, a cross dichroic prism 813, and a projection lens 814.

The polarization illumination device 50 includes a light source 60 and a polarization generation device 70. An unpolarized light beam including an s-polarized light beam component and a p-polarized light beam component exits from the light source 60. The polarization generation device 70 converts the light beam which has exited the light source 60 into one type of linearly polarized light beam (an s-polarized light beam in the embodiment) whose polarization directions are substantially aligned, and the resulting polarized light beam illuminates illumination areas. Here, the three liquid crystal light valves 803, 805, and 811 correspond to the illumination areas.

The polarization generation device 70 includes a first optical element 200 and a second optical element 400. The first optical element 200 is a lens array in which small lenses 201 with rectangular contours are disposed in a matrix arrangement. The second optical element 600 (shown in FIG. 20) includes an optical element 300 and a light exiting side lens 390.

The optical element 300 includes a condensing lens array 310 and two polarization conversion elements 320a and 320b. The condensing lens array 310 has the same structure as the first optical element 200, and is disposed so as to oppose the first optical element 200. The condensing lens array 310 functions, along with the first optical element 200, to gather a plurality of partial light beams divided at the small lenses 201 in order to guide them to incident areas of the polarization conversion elements 320a and 320b. The polarization conversion elements 320a and 320b are disposed so that the polarization separation films 331 and the reflection films 332 of the polarization conversion element 320 (shown in FIG. 1) of the present invention symmetrically face each other with respect to an optical axis disposed therebetween. Therefore, the light beam which has exited the light source 60 is converted into substantially one type of linearly polarized light beam (an s-polarized light beam in the embodiment) by the polarization generation device 70.

The light exiting side lens 390 functions to superimpose the plurality of partial light beams exiting from the optical element 300 onto each of the liquid crystal light valves 803, 805, and 811.

The light beam which has exited the polarization illumination device 50 is separated into three color light beams, a red light beam, a green light beam, and a blue light beam, by the dichroic mirrors 801 and 804 functioning together as a color light beam separation optical system. The blue light beam is guided by the relay system 850 which is comprised of three relay lenses 806, 808, and 810, and two reflection mirrors 807 and 809 to the liquid crystal light valve 811. The separated color light beams are modulated by their respective color-light liquid crystal light valves 803, 805, and 811 in accordance with provided image information (image signals). These liquid crystal light valves 803, 805, and 811 correspond to light-modulating devices in the present invention. The color light beams modulated by their respective liquid crystal light valves 803, 805, and 811 are synthesized by the cross dichroic prism 813 serving as a color-light synthesizing optical system, and the resulting synthesized light beams are projected onto a screen 81 5 by the projection lens 814 serving as a projection optical system. This causes a color image to be displayed on the screen 815. The structures and functions of the parts of the projector such as those shown in FIG. 20 are discussed in detail in Japanese Unexamined Patent Application Publication No. 10-177151 disclosed by the present applicant, so that they will not be described in the specification.

Since the polarization conversion elements 320*a* and 320*b* produced by a method of the present invention are used in the polarization illumination device 50 of the projector 800, the light beam from the light source 60 incident on the polarization illumination device 50 is converted into a desired linearly polarized light beam (an s-polarized light beam in the embodiment) with high efficiency, and the polarized light beam exits the polarization illumination device 50. Therefore, in the projector including the polarization conversion elements 320*a* and 320*b*, the intensity of the image projected onto the screen 815 can be increased. Since the number of man-hours required to produce the polarization conversion elements 320*a* and 320*b* can be made less than that required to produce the comparative-example polarization conversion element, the number of man-hours required to manufacture the entire projector can be decreased.

The present invention is not limited to the above-described embodiments and forms, so that it can be carried out in various other forms within the scope of the gist of the invention. For example, the following modifications can be made.

(1) Although, in the embodiment, dielectric multi-layered films based on the present invention are used for the polarization separation films 331 and the reflection films 332, dielectric multi-layered films may be used only for the polarization separation films 331 or only for the reflection films 332. In other words, the polarization separation films 331 alone may be dielectric multi-layered films based on the present invention, or the reflection films 332 alone may be dielectric multi-layered films based on the present invention.

(2) The polarization illumination device in accordance with the present invention may be applied to various devices other than the projector shown in FIG. 20. For example, the polarization illumination device in accordance with the present invention may be applied to a projector which projects a black-and-white image instead of a color image. In this case, with reference to the device of FIG. 20, only one liquid crystal light valve is required, and the color-light separation optical system which separates a light beam into three color light beams and the color-light synthesizing optical system for synthesizing the three color light beams are not required. In addition, the present invention may also be applied to a projection color display device which uses only one light valve. Further, the present invention may be applied to a projector using a reflection light valve or to an image display device, such as a rear display device, which uses polarization illumination light.

What is claimed is:

1. A method of producing a polarization conversion element for converting an unpolarized light beam incident thereto to a predetermined polarized light beam, the method comprising the steps of:

(a) providing a plurality of first transmissive plates;

(b) providing a plurality of second transmissive plates;

(c) forming a plurality of polarization separation films and a plurality of reflection films on surfaces of portions of at least one of the first transmissive plates and the second transmissive plates so that the plurality of polarization separation films and the plurality of reflection films are alternately disposed on interfaces of the transmissive plates when the plurality of first transmissive plates and the plurality of second transmissive plates are alternately disposed and bonded together;

(d) producing a composite plate having the plurality of polarization separation films and the plurality of reflection films alternately disposed on each of the interfaces of each of the transmissive plates as a result of alternately disposing and bonding together the plurality of first transmissive plates and the plurality of second transmissive plates; and (e) producing a transmissive block having a light-incident surface and a light-exiting surface formed parallel to cut surfaces formed by cutting the composite plate along cutting planes parallel to planes at a predetermined angle from planar surfaces of the composite plate;

wherein step (d) includes the step of forming the polarization separation films so that a transmittance ratio of each polarization separation film for an ultraviolet light beam of a particular wavelength region incident on a surface of each polarization separation film at an angle of incidence of approximately 0 degrees is approximately 40% or more.

2. The method of producing a polarization conversion element according to claim 1, wherein the particular wavelength region lies in a range of 365 nm±30 nm.

3. The producing method according to claim 1, wherein the step of forming the polarization separation films includes the step of forming multilayered structural sections formed by alternately placing first and second layers upon each other, with a refractive index of each first layer being smaller than a refractive index of each transmissive plate and a refractive index of each second layer being greater than the refractive index of each transmissive plate;

wherein the refractive index of each transmissive plate is approximately 1.48 to approximately 1.58; and wherein the first layers of the polarization separation films are each formed of $MgF_2$, and the second layers of the polarization separation films are each formed of MgO.

4. The method of producing a polarization conversion element according to claim 1, wherein the step (d) comprises the step of forming the reflection films so that a transmittance ratio of each reflection film for an ultraviolet light beam of a particular wavelength region incident on a surface of each reflection film at an angle of incidence of approximately 0 degrees is approximately 40% or more.

5. The method of producing a polarization conversion element according to claim 4, wherein the particular wavelength region lies in a range of 365 nm±30 nm.

6. The method of producing a polarization conversion element according to claim 4, wherein the step of forming the reflection films includes the step of forming multilayered structural sections formed by alternately placing third and fourth layers upon each other, with a refractive index of each third layer being smaller than a refractive index of each transmissive plate and a refractive index of each fourth layer being greater than the refractive index of each transmissive plate;

wherein each transmissive plate has a refractive index of approximately 1.48 to approximately 1.58; and wherein the third layers of the reflection films are each formed of $SiO_2$, and the fourth layers of the reflection films are each formed of $TiO_2$ or $Ta_2O_5$.

7. A method of producing a polarization conversion element for converting an unpolarized light beam incident thereto to a predetermined polarized light beam, the method comprising the steps of:

(a) providing a plurality of first transmissive plates;
(b) providing a plurality of second transmissive plates;
(c) forming a plurality of polarization separation films and a plurality of reflection films on surfaces of portions of at least one of the first transmissive plates and the second transmissive plates so that the plurality of polarization separation films and the plurality of reflection films are alternately disposed on interfaces of the transmissive plates when the plurality of first transmissive plates and the plurality of second transmissive plates are alternately disposed and bonded together;
(d) producing a composite plate having the plurality of polarization separation films and the plurality of reflection films alternately disposed on each of the interfaces of each of the transmissive plates as a result of alternately disposing and bonding together the plurality of first transmissive plates and the plurality of second transmissive plates; and
(e) producing a transmissive block having a light-incident surface and a light-exiting surface formed parallel to cut surfaces formed by cutting the composite plate along cutting planes parallel to planes at a predetermined angle from planar surfaces of the composite plate;

wherein the step (d) includes the step of forming the reflection films so that a transmittance ratio of each reflection film for an ultraviolet light beam of a particular wavelength region incident to a surface of each reflection film at an angle of incidence of approximately 0 degrees is approximately 40% or more.

8. The method of producing a polarization conversion element according to claim 7, wherein the particular wavelength region lies in a range of 365 nm±30 nm.

9. The method of producing a polarization conversion element according to claim 7, wherein the step of forming the polarization separation films includes the step of forming multilayered structural sections formed by alternately placing third and fourth layers upon each other, with a refractive index of each third layer being smaller than a refractive index of each transmissive plate and a refractive index of each fourth layer being greater than the refractive index of each transmissive plate;

wherein the refractive index of each transmissive plate is approximately 1.48 to approximately 1.58; and wherein the third layers of the reflection films are each formed of $SiO_2$, and the fourth layers of the reflection films are each formed of either $TiO_2$ or $Ta_2O_5$.

10. A polarization conversion element for converting an unpolarized light beam incident thereto into a predetermined polarized light beam, the polarization conversion element comprising:

a plurality of transmissive members arranged along a predetermined direction; and a plurality of polarization separation films and a plurality of reflection films alternately disposed between the plurality of transmissive members;

wherein a transmittance ratio of each polarization separation film for an ultraviolet light beam of a particular wavelength region incident to a surface of each polarization separation film at an angle of incidence of approximately 0 degrees is approximately 40% or more.

11. The polarization conversion element according to claim 10, wherein the particular wavelength region lies in a range of 365 nm±30 nm.

12. The polarization conversion element according to claim 10, wherein a refractive index of each transmissive member is approximately 1.48 to approximately 1.58;

wherein the polarization separation films each include a multilayered structure section having first and second layers alternately placed upon each other, with a refractive index of each first layer being smaller than the refractive index of each transmissive member and a refractive index of each second layer being greater than the refractive index of each transmissive member; and wherein the first layers of the polarization separation films are each formed of $MgF_2$, and the second layers thereof are each formed of MgO.

13. The polarization conversion element according to claim 10, wherein a transmittance ratio of each reflection film for an ultraviolet light beam of a particular wavelength region incident on a surface of each reflection film at an angle of incidence of approximately 0 degrees is approximately 40% or more.

14. The polarization conversion element according to claim 13, wherein the particular wavelength region lies in a range of 365 nm±30 nm.

15. The polarization conversion element according to claim 13, wherein each transmissive member has a refractive index of approximately 1.48 to approximately 1.58;

wherein the reflection films each include a multilayered structural section formed by alternately placing third and fourth layers upon each other, with a refractive index of each third layer being smaller than the refractive index of each transmissive member and a refractive index of each fourth layer being greater than the refractive index of each transmissive member; and wherein the third layers of the reflection films are each formed of $SiO_2$, and the fourth layers thereof are each formed of either $TiO_2$ or $Ta_2O_5$.

16. A polarization conversion element for converting an unpolarized light beam incident thereto into a predetermined polarized light beam, the polarization conversion element comprising:

a plurality of transmissive members arranged along a predetermined direction; and a plurality of polarization separation films and a plurality of reflection films alternately disposed between the plurality of transmissive members;

wherein a transmittance ratio of each reflection film for an ultraviolet light beam of a particular wavelength region incident on a surface of each reflection film at an angle of incidence of approximately 0 degrees is approximately 40% or more.

17. The polarization conversion element according to claim 16, wherein the particular wavelength region lies in a range of 365 nm±30 nm.

18. The polarization conversion element according to claim 16, wherein a refractive index of each transmissive member is approximately 1.48 to approximately 1.58;

wherein each reflection film includes a multilayered structural section formed by alternately placing third and fourth layers upon each other, with a refractive index of each third layer being smaller than the refractive index of each transmissive member and a refractive index of each fourth layer being greater than the refractive index of each transmissive member; and wherein the third layers of the reflection films are each formed of $SiO_2$, and the fourth layers thereof are each formed of either $TiO_2$ or $Ta_2O_5$.

19. A projector for projecting and displaying an image, the projector comprising:

a light source from where an unpolarized light beam exits;

a polarization conversion element for converting the light beam from the light source into a predetermined polarized light beam;

a light modulation device for modulating the light beam which exits from the polarization conversion element based on a provided image signal; and a projection optical system for projecting the light beam modulated by the light modulation device;

wherein the polarization conversion element comprises:

a plurality of transmissive members arranged along a predetermined direction; and a plurality of polarization separation films and a plurality of reflection films alternately disposed between the plurality of transmissive members; and wherein a transmittance ratio of each polarization separation film for an ultraviolet light beam of a particular wavelength region incident on a surface of each polarization separation film at an angle of incidence of approximately 0 degrees is approximately 40% or more.

20. The projector according to claim 19, wherein a transmittance ratio of each reflection film for an ultraviolet light beam of a particular wavelength region incident on a surface of each reflection film at an angle of incidence of approximately 0 degrees is approximately 40% or more.

21. A projector for projecting and displaying an image, the projector comprising:

a light source from where an unpolarized light beam exits;

a polarization conversion element for converting the light beam from the light source into a predetermined polarized light beam; and a light modulation device for modulating the light beam which exits from the polarization conversion element based on a provided image signal; and a projection optical system for projecting the light beam modulated by the light modulation device;

wherein the polarization conversion element comprises:

a plurality of transmissive members arranged in a predetermined direction; and a plurality of polarization separation films and a plurality of reflection films alternately disposed between the plurality of transmissive members; and wherein a transmittance ratio of each reflection film for an ultraviolet light beam of a particular wavelength region incident on a surface of each reflection film at an angle of incidence of approximately 0 degrees is approximately 40% or more.

22. The producing method according to claim 2, wherein the step of forming the polarization separation films includes the step of forming multilayered structural sections formed by alternately placing first and second layers upon each other, with a refractive index of each first layer being smaller than a refractive index of each transmissive plate and a refractive index of each second layer being greater than the refractive index of each transmissive plate;

wherein the refractive index of each transmissive plate is approximately 1.48 to approximately 1.58; and wherein the first layers of the polarization separation films are each formed of $MgF_2$, and the second layers of the polarization separation films are each formed of MgO.

23. The method of producing a polarization conversion element according to claim 2, wherein the step (d) comprises the step of forming the reflection films so that a transmittance ratio of each reflection film for an ultraviolet light beam of a particular wavelength region incident on a surface of each reflection film at an angle of incidence of approximately 0 degrees is approximately 40% or more.

24. The method of producing a polarization conversion element according to claim 3, wherein the step (d) comprises the step of forming the reflection films so that a transmittance ratio of each reflection film for an ultraviolet light beam of a particular wavelength region incident on a surface of each reflection film at an angle of incidence of approximately 0 degrees is approximately 40% or more.

25. The method of producing a polarization conversion element according to claim 5, wherein the step of forming the reflection films includes the step of forming multilayered structural sections formed by alternately placing third and fourth layers upon each other, with a refractive index of each third layer being smaller than a refractive index of each transmissive plate and a refractive index of each fourth layer being greater than the refractive index of each transmissive plate;

wherein each transmissive plate has a refractive index of approximately 1.48 to approximately 1.58; and wherein the third layers of the reflection films are each formed of $SiO_2$, and the fourth layers of the reflection films are each formed of $TiO_2$ or $Ta_2O_5$.

26. The method of producing a polarization conversion element according to claim 8, wherein the step of forming the polarization separation films includes the step of forming multilayered structural sections formed by alternately placing third and fourth layers upon each other, with a refractive index of each third layer being smaller than a refractive index of each transmissive plate and a refractive index of each fourth layer being greater than the refractive index of each transmissive plate;

wherein the refractive index of each transmissive plate is approximately 1.48 to approximately 1.58; and wherein the third layers of the reflection films are each formed of $SiO_2$, and the fourth layers of the reflection films are each formed of either $TiO_2$ or $Ta_2O_5$.

27. The polarization conversion element according to claim 11, wherein a refractive index of each transmissive member is approximately 1.48 to approximately 1.58;

wherein the polarization separation films each include a multilayered structure section having first and second layers alternately placed upon each other, with a refractive index of each first layer being smaller than the refractive index of each transmissive member and a refractive index of each second layer being greater than the refractive index of each transmissive member; and wherein the first layers of the polarization separation films are each formed of $MgF_2$, and the second layers thereof are each formed of MgO.

28. The polarization conversion element according to claim 11, wherein a transmittance ratio of each reflection film for an ultraviolet light beam of a particular wavelength region incident on a surface of each reflection film at an angle of incidence of approximately 0 degrees is approximately 40% or more.

29. The polarization conversion element according to claim 12, wherein a transmittance ratio of each reflection film for an ultraviolet light beam of a particular wavelength region incident on a surface of each reflection film at an angle of incidence of approximately 0 degrees is approximately 40% or more.

30. The polarization conversion element according to claim 14, wherein each transmissive member has a refractive index of approximately 1.48 to approximately 1.58;

wherein the reflection films each include a multilayered structural section formed by alternately placing third and fourth layers upon each other, with a refractive index of each third layer being smaller than the refractive index of each transmissive member and a refractive index of each fourth layer being greater than the refractive index of each transmissive member; and wherein the third layers of the reflection films are each formed of $SiO_2$, and the fourth layers thereof are each formed of either $TiO_2$ or $Ta_2O_5$.

31. The polarization conversion element according to claim 17, wherein a refractive index of each transmissive member is approximately 1.48 to approximately 1.58;

wherein each reflection film includes a multilayered structural section formed by alternately placing third and fourth layers upon each other, with a refractive index of each third layer being smaller than the refractive index of each transmissive member and a refractive index of each fourth layer being greater than the refractive index of each transmissive member; and wherein the third layers of the reflection films are each formed of $SiO_2$, and the fourth layers thereof are each formed of either $TiO_2$ or $Ta_2O_5$.

* * * * *